US007139580B2

(12) United States Patent
Stein et al.

(10) Patent No.: US 7,139,580 B2
(45) Date of Patent: Nov. 21, 2006

(54) METHOD AND APPARATUS FOR ESTIMATING THE POSITION OF A TERMINAL BASED ON IDENTIFICATION CODES FOR TRANSMISSION SOURCES

(75) Inventors: Jeremy M. Stein, Haifa (IL); Haim Weissman, Haifa (IL)

(73) Assignee: Qualcomm Incorporated, San Diego, CA (US)

( * ) Notice: Subject to any disclaimer, the term of this patent is extended or adjusted under 35 U.S.C. 154(b) by 510 days.

(21) Appl. No.: 10/132,908

(22) Filed: Apr. 24, 2002

(65) Prior Publication Data

US 2003/0008669 A1 Jan. 9, 2003

Related U.S. Application Data

(63) Continuation-in-part of application No. 09/933,629, filed on Aug. 20, 2001, now abandoned, which is a continuation-in-part of application No. 09/904,330, filed on Jul. 12, 2001, now abandoned.

(60) Provisional application No. 60/299,315, filed on Jun. 18, 2001, provisional application No. 60/286,274, filed on Apr. 24, 2001.

(51) Int. Cl.
*H04Q 7/20* (2006.01)
(52) U.S. Cl. .............................. 455/456.1; 455/456.5; 455/517; 455/414.2
(58) Field of Classification Search ............ 455/456.1, 455/456.3, 456.5, 456.6, 414.2, 422.1, 435.1, 455/435.2, 11.1, 9, 506, 507, 517, 12.1, 13.1, 455/404.2, 67.11, 115.1, 456.2; 342/357.01, 342/357.14, 357.12, 357.05, 357.02; 370/345, 370/337
See application file for complete search history.

(56) References Cited

U.S. PATENT DOCUMENTS

| 5,263,177 | A | * | 11/1993 | Schieve et al. ............. 455/503 |
| 6,101,176 | A | * | 8/2000 | Honkasalo et al. ......... 370/335 |
| 6,157,842 | A | * | 12/2000 | Karlsson et al. ......... 455/456.2 |
| 6,415,155 | B1 | * | 7/2002 | Koshima et al. ......... 455/456.1 |
| 6,424,819 | B1 | * | 7/2002 | Yan ........................... 455/11.1 |
| 6,498,585 | B1 | * | 12/2002 | Jandrell ................. 342/357.12 |
| 6,753,812 | B1 | * | 6/2004 | Rabinowitz et al. ........ 342/464 |
| 6,785,321 | B1 | * | 8/2004 | Yang et al. .................. 375/137 |
| 6,831,911 | B1 | * | 12/2004 | Sridharan et al. ........... 370/345 |
| 6,909,902 | B1 | * | 6/2005 | Sawada et al. .......... 455/456.1 |
| 2002/0097181 | A1 | * | 7/2002 | Chou et al. ............ 342/357.06 |

* cited by examiner

*Primary Examiner*—Edward F. Urban
*Assistant Examiner*—John J. Lee
(74) *Attorney, Agent, or Firm*—Philip Wadsworth; Bruce W. Greenhaus; Andrea L. Mays

(57) ABSTRACT

Techniques to determine the position of a terminal under the coverage of a repeater in a wireless communication system. In an aspect, an identification code is transmitted for each repeater and used by the terminal (or a PDE) to unambiguously identify the repeater. The identification codes for the repeaters in the system can be implemented with PN sequences at defined offsets that are specifically reserved for repeater identification. In another aspect, the identification code for each repeater is transmitted using a spread-spectrum signal designed to have minimal impact on the performance of the system and to be recoverable by the terminal in similar manner as for a forward modulated signal. In this way, no additional hardware is required for the terminal to recover the identifier signal. In one specific design, the spread spectrum identifier signal is generated in accordance with and conforms to the IS-95 CDMA standard.

33 Claims, 12 Drawing Sheets

METHOD AND APPARATUS FOR ESTIMATING THE POSITION OF A TERMINAL BASED ON IDENTIFICATION CODES FOR TRANSMISSION SOURCES

RELATED APPLICATIONS

This application is a continuation in part of U.S. patent application Ser. No. 09/933,629, filed Aug. 20, 2001, now abandoned entitled "METHOD AND APPARATUS FOR ESTIMATING THE POSITION OF A TERMINAL BASED ON IDENTIFICATION CODES FOR TRANSMISSION SOURCES," which is a continuation in part of U.S. patent application Ser. No. 09/904,330, filed Jul. 12, 2001, now abandoned entitled "METHOD AND APPARATUS FOR ESTIMATING THE POSITION OF A TERMINAL BASED ON IDENTIFICATION CODES FOR TRANSMISSION SOURCES", all of which claims priority to U.S. Provisional Application No. 60/286,274, filed Apr. 24, 2001 and U.S. Provisional Application No. 60/299,315, filed Jun. 18, 2001.

FIELD OF THE INVENTION

The present invention relates generally to position determination and more specifically to techniques for providing an estimate of the location of a terminal in a wireless communication system based on identification codes assigned to transmission sources such as repeaters.

BACKGROUND OF THE INVENTION

A common technique to locate a terminal is to determine the amount of time required for signals transmitted from multiple transmitters at known locations to reach the terminal. One system that provides signals from a plurality of transmitters at known locations is the well-known Global Positioning Satellite (GPS) system. Satellites in the GPS system are placed in precise orbits according to a GPS master plan. The position of the GPS satellites can be determined by different sets of information (commonly known as the "Almanac" and "Ephemeris") transmitted by the satellites themselves. Another system that provides signals from transmitters (e.g., base stations) at known earth-bound locations is a wireless (e.g., cellular telephone) communication system.

Many wireless communication systems employ repeaters to provide coverage for designated areas within the system or to extend the coverage of the system. For example, a repeater may be used to cover a particular area not covered by a base station due to fading conditions (i.e., a "hole" within the system). Repeaters may also be used to extend coverage into rural areas (e.g., along a freeway) that are outside the coverage area of the base stations. A repeater receives, conditions, and retransmits signals on both the forward link (i.e., the path from the base station to the mobile unit) and reverse link (i.e., the path from the mobile unit to the base station).

Various challenges are encountered in determining the location of a terminal in a system in which one or more repeaters are employed. Typically, a signal from a single base station is processed and retransmitted by a repeater at relatively high power and with a delay. The combination of the repeated signal's high power plus the isolation normally associated with the repeater's coverage area often prevent a terminal from receiving other signals from other base stations. Moreover, in many cases in which repeaters are used (e.g., inside buildings, tunnels, subways, and so on), the signals from GPS satellites have insufficient power levels to be received by the terminal. In this case, a limited number of signals (possibly only one signal, from the repeater) may be available for use to determine the terminal's location. Furthermore, the additional delays introduced by repeaters can distort the round trip delay/time of arrival (RTD/TOA) measurements as well as the TDOA measurements, which then results in inaccurate position estimate based on these measurements.

FIG. 1A is a diagram of a wireless communication system 100 that employs repeaters in accordance with the disclosed method and apparatus. System 100 may be designed to conform to one or more commonly known industry standards, such as IS-95, published by the Telecommunications Industry Association/Electronics Industry Association (TIA/EIA), and other such industry standards for systems such as W-CDMA, cdma2000, or a combination thereof. System 100 includes a number of base stations 104. Each base station serves a particular coverage area 102. While only three base stations 104a through 104c are shown in FIG. 1A for simplicity, it will be understood by those skilled in the art that there are typically many more such base stations in such a system. For the purpose of this disclosure, the base station and its coverage area are collectively referred to as a "cell".

One or more repeaters 114 may be employed by system 100 to provide coverage for regions that would not otherwise be covered by a base station (e.g., due to fading conditions, such as region 112a shown in FIG. 1A) or to extend the coverage of the system (such as regions 112b and 112c). For example, repeaters are commonly used to improve indoor coverage for a cellular system at relatively low costs. Each repeater 114 couples to a "serving" base station 104 via a wireless or wireline link (e.g., a coaxial or fiber optic cable) either directly or through another repeater. Any number of base stations within the system may be repeated, depending on the particular system design.

A number of terminals 106 are typically dispersed throughout the system (only one terminal is shown in FIG. 1A for simplicity). Each terminal 106 may communicate with one or more base stations on the forward and reverse links at any moment, depending on whether or not soft handoff is supported by the system and whether or not the terminal is actually in soft handoff. It will be understood by those skilled in the art that "soft handoff" refers to a condition in which a terminal is in communication with more than one base station at the same time.

A number of base stations 104 are typically coupled to one base station controller (BSC) 120. BSC 120 coordinates the communication for base stations 104. For the purpose of determining the position of terminal, base station controller 120 may also be coupled to a Position Determining Entity (PDE) 130. PDE 130 receives time measurements and/or identification codes from the terminals and provides control and other information related to position determination, as described in further detail below.

For position determination, a terminal may measure the arrival times of signal transmissions from a number of base stations. For a CDMA network, these arrival times can be determined from the phases of the pseudo-noise (PN) codes used by the base stations to spread their data prior to transmission to the terminals over the forward link. The PN phases detected by a terminal may then be reported to the PDE (e.g., via IS-801 signaling). The PDE then uses the reported PN phase measurements to determine pseudo-ranges, which are then used to determine the position of the terminal.

The position of a terminal may also be determined using a hybrid scheme whereby signal arrival times (i.e., times of arrival (TOA)) are measured for any combination of base stations 104 and Global Positioning System (GPS) satellites 124. The measurements derived from GPS satellites may be used as the primary measurements or to supplement the measurements derived from the base stations. The measurements from the GPS satellites are typically more accurate than those from the base stations. However, clear line-of-sight to the satellites is typically required to receive the GPS signals. Accordingly, the use of GPS satellites for position determination is generally limited to outdoor environment where obstructions are not present. GPS signals typically cannot be received indoors or in other environments where there are obstructions such as foliage or buildings. However, GPS has extensive coverage and four or more GPS satellites can potentially be received from virtually anywhere that there are no such obstructions.

In contrast, base stations are typically located in populated areas and their signals are able to penetrate some buildings and obstructions. Therefore, it is possible for base stations to be used in cities and potentially within buildings to determine the location of devices that can receive and/or transmit such signals. However, the measurements derived from base stations are typically less accurate than those from GPS satellites because multiple signals may be received at the terminal from a particular base station due to a phenomenon known as "multipath". Multipath refers to the situation in which signals are received via multiple transmission paths between the transmitter and receiver. Such multiple paths are generated by signals reflecting off various objects, such as buildings, mountains, etc. It should be noted that in the best case, the signal is also received on a direct path (straight line) from the transmitter to the receiver. However, this may not necessarily be true.

In the hybrid scheme, each base station and each GPS satellite represents a transmission source. To determine a two-dimensional estimate of the position of a terminal, the transmissions from three or more non-spatially aligned sources are received and processed. A fourth source may be used to provide altitude (a third dimension) and may also provide increased accuracy (i.e., reduced uncertainty in the measured arrival times). The signal arrival times can be determined for the transmission sources and used to compute pseudo-ranges, which can then be used (e.g., via a trilateration technique) to determine the position of the terminal. Position determination can be achieved by well know means, such as is described in the 3GPP 25.305, TIA/EIA/IS-801, and TIA/EIA/IS-817 standard documents.

In the example shown in FIG. 1A, terminal 106 may receive transmissions from GPS satellites 124, base stations 104, and/or repeater 114. Terminal 106 measures the signal arrival times of the transmissions from these transmitters and may report these measurements to PDE 130 via BSC 120. PDE 130 can then use the measurements to determine the position of terminal 106.

As noted above, repeaters may be used to provide coverage for regions not covered by the base stations, such as within buildings. Repeaters are more cost effective than base stations, and can be advantageously deployed where additional capacity is not required. However, a repeater is associated with additional delays due to circuitry within the repeater and cabling and/or additional transmission associated with the repeater. As an example, surface acoustic wave (SAW) filters, amplifiers, and other components within the repeater introduce additional delays that are comparable to, or may be even greater than, the transmission delays from the base station to the terminal. If the repeater delays are not taken into account, then the time measurements of the signals from repeaters cannot be reliably used to determine the position of a terminal.

FIG. 1B is a diagram illustrating the use of a repeater 114$x$ to provide indoor coverage for a building 150. In the example shown, repeater 114$x$ comprises a main unit (MU) 115 coupled to a number of remote units (RUs) 116. On the forward link, main unit 115 receives one or more signals from one or more base stations and repeats all or a subset of the received signals to each of the remote units. And on the reverse link, main unit 115 receives, combines, and repeats the signals from remote units 116 for transmission on the reverse link back to one or more base stations. Each remote unit 116 provides coverage for a particular area (e.g., one floor) of the building and repeats the forward and reverse link signals for its coverage area.

Various challenges are encountered in estimating the position of a terminal located within a building where a repeater may be employed to provide coverage. First, in many indoor applications, the terminals are not able to receive signals from the base stations or GPS satellites, or may receive signals from fewer transmitters than required to perform trilateration. To provide in-building coverage, a repeater typically retransmits a signal from a single base station at relatively high power and with a delay. The combination of the repeated signal's high power plus the isolated indoor location of the terminal normally prevent the terminal from receiving other signals from other base stations and satellites.

Second, if the amount of delay introduced by the repeater is not known, then the signal from the repeater cannot be reliably used as one of the signals for trilateration. This then prevents an entity (e.g., the PDE or terminal) from utilizing the repeated signal to derive a positioning estimate with one less satellite or base station signal. Third, in many environments where repeaters are used (e.g., subways, buildings, and so on) GPS signals cannot be received, even when a terminal employs a receiver unit with enhanced sensitivity. And fourth, the entity used to determine the terminal's position has no way of determining whether the terminal was using an incorrect timing reference (due to the uncertain repeater delay), which would affect the accuracy of the round trip delay (RTD) measurements and the time stamp on the GPS measurements.

There is therefore a need in the art for techniques to provide a position estimate of a terminal in a wireless communication system that employs repeaters (or other transmission sources with similar characteristics).

SUMMARY

The presently disclosed method and apparatus determine the position of a terminal communicating through a repeater in a wireless communication system. It is recognized by the disclosed method and apparatus that repeaters used to provide indoor coverage are typically designed to cover a relatively small geographical area (e.g., a building, a floor of the building, and so on). If the coverage area of a repeater is small, the position estimate for a terminal under the repeater's coverage can be reported as a designated location within this coverage area, which may be the center of the coverage area. In many (if not most) cases, this reported position estimate for the terminal is within 50 meters of the terminal's actual position. This accuracy is sufficient for an enhanced emergency 911 (E-911) service mandated by the Federal Communications Commission (FCC).

In accordance with one embodiment of the disclosed method and apparatus, an identification code uniquely associated with each repeater is sent by each repeater within a particular coverage area (e.g., a cell). The identification code can then be used by a terminal (or a PDE) to unambiguously identify the repeater. Various types of codes may be used as identification codes. In one embodiment, the identification codes comprise pseudo-noise (PN) sequences at defined offsets that are specifically reserved for repeater identification.

For cases where repeaters cover small geographic areas, identification of the specific repeater through which the signal was received can be used to estimate the terminals location as, e.g., the center of repeater's coverage area. For cases where repeaters cover larger areas, identification of the specific repeater through which the signal was received can be used to adjust measurements according to the delay of the repeater.

In another embodiment, the identification code for each repeater is transmitted using a spread-spectrum signal. This spread spectrum identifier signal can be designed to have minimal impact on the performance of the CDMA system and can be recovered in similar manner as a forward modulated signal transmitted from a base station or a repeater. In this way, no additional hardware is required for a terminal to recover the identifier signal. In an embodiment, the spread spectrum identifier signal is generated in accordance with and conforms to the IS-95 CDMA standard.

In yet another embodiment of the disclosed method and apparatus, when a signal is determined to have passed through a repeater, that signal is not used in position location calculations. This provides a simple and inexpensive way to ensure that the delay that is added to the signals travel time from the base station to the terminal does not cause an error in the position location calculations. That is, since the propagation delay between the time the signal is transmitted from the base station and the time the signal is received by the terminal will not accurately reflect the distance between the base station and the terminal, this delay should not be used in position location calculations. If additional information is available regarding the identity of the repeater that the signal passed through and the location of that repeater, then that information can be used in the calculation. However, it should be noted that there may be sufficient information from other signals that do not pass through repeaters to make it possible to calculate the position of the terminal without using information from signals that do pass through a repeater. In either case, it is important that the fact that the signal passed through a repeater be known so that the additional delay imparted on the signal by the repeater can be taken into account, either by not using timing information for that signal, or by adjusting that timing information appropriately.

The techniques described herein may be used in various CDMA systems (e.g., systems that comply with the following industry standard: IS-95, cdma2000, W-CDMA, IS-801) and various non-CDMA systems (e.g., GSM, TDMA, analog, etc.).

BRIEF DESCRIPTION OF THE DRAWINGS

The features, nature, and advantages of the disclosed method and apparatus will become more apparent from the detailed description set forth below when taken in conjunction with the drawings in which like reference characters identify correspondingly throughout and wherein.

DETAILED DESCRIPTION

Figure 1A:
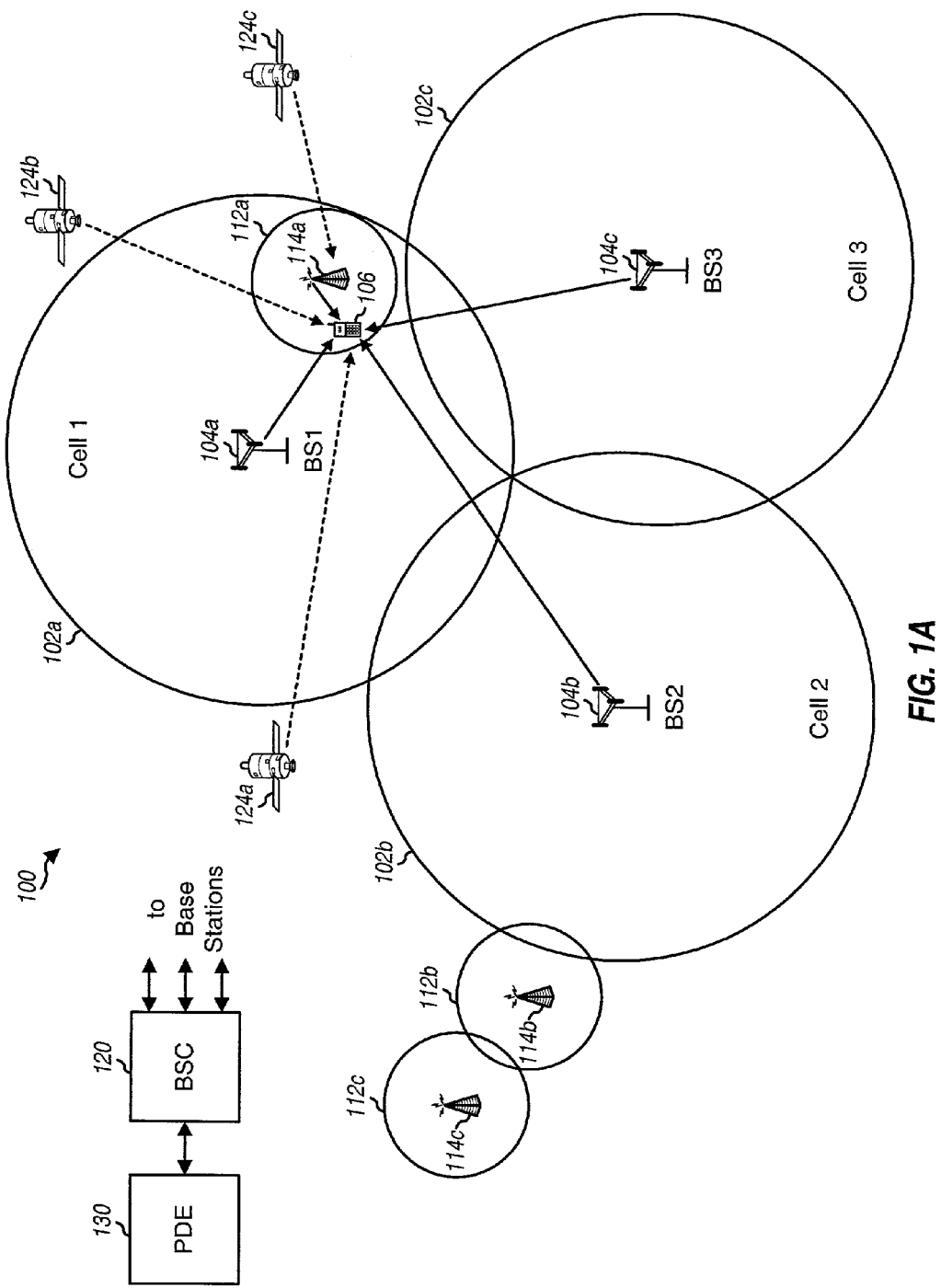
FIG. 1A is a diagram of a wireless communication system that employs repeaters and is capable of implementing various aspects and embodiments of the disclosed method and apparatus.

Aspects of the disclosed method and apparatus provide techniques to determine the position of a terminal under the coverage of a repeater in a wireless communication system. In one aspect, techniques are provided for each repeater to send an identification code that can be used by the terminal (or the PDE) to ascertain the repeater's identity. This information can then be used to estimate the position of the terminal, as described below.

It is recognized by the disclosed method and apparatus that repeaters used to provide indoor coverage are typically designed to cover relatively small geographical areas (e.g., a building, a floor of the building, and so on). In an embodiment, since the coverage area of a repeater is typically small, the position estimate for a terminal under the repeater's coverage can be reported as a designated location within this coverage area, which may be the center of the coverage area. In many (if not most) cases, this reported position estimate for the terminal will be within 50 meters of the terminal's actual position. This accuracy is sufficient for an enhanced emergency 911 (E-911) service mandated by the Federal Communications Commission (FCC), which requires the location of a terminal in a 911 call to be sent to a Public Safety Answering Point (PSAP). For a handset terminal, the E-911 mandate requires the position estimate to be within 50 meters 67% of the time and within 150 meters 95% of the time. These requirements can be met with the techniques described herein.

Various schemes may be used to identify the repeaters to the terminals. In one scheme, each repeater within a particular coverage area (e.g., a cell) is assigned a unique identification code that may be used to unambiguously identify the repeater. Multiple identification codes may be assigned to multiple repeaters within the particular coverage area. This may be applicable, for example, in a very large building where multiple repeaters are used to provide coverage and are spaced far apart (e.g., more than 100 meters apart). Alternatively, multiple repeaters may be assigned a common identification code if these repeaters are located within a sufficiently small area. A single position estimate may then be used for all these repeaters.

For each repeater, the identification code assigned to the repeater and a position estimate to be provided for the terminals within the repeater's coverage (e.g., the center of the repeater's coverage area) may be stored in a table. This table may be maintained at the PDE. In this case, a terminal can receive the identification code from the repeater and send this code back to the PDE (e.g., in a coded format), which can then provide the position estimate for the terminal based on the value (e.g., the coverage center) stored in the table. Alternatively or additionally, the table may be maintained at the terminal or some other entity (e.g., the base station, BSC, and so on).

The scheme used to transmit the repeater's identification codes to the terminals may be designed based on various criteria. First, the identification codes should be transmitted in a manner that is compatible with an existing CDMA standard (e.g., IS-95, cdma2000, W-CDMA, IS-801, and so on) that may be supported by the system. Second, the scheme should be compatible with the capabilities of terminals already deployed and in use in the field, which would then allow existing terminals to perform position determination based on the identification codes. Third, the identification codes should be transmitted to the terminals within the same frequency band to which the terminals are tuned so that both a repeated signal and the corresponding identification code can be concurrently received using a single receiver unit. And fourth, the signals used to transmit the identification codes should minimally impact the performance of the system.

In another aspect, the identification code for each repeater is transmitted using a spread-spectrum signal, which can provide numerous advantages. First, the spread spectrum identifier signal can be designed to have minimal impact on the performance of the CDMA system. Second, the spread spectrum identifier signal resembles and can be recovered in similar manner as for a forward modulated signal from a base station or a repeater. In this way, no additional hardware is required for a terminal to recover the identifier signal. Existing terminals already deployed in the field and capable of receiving and processing CDMA signals can also receive and process the identifier signals from the repeaters.

In an embodiment, the spread spectrum identifier signals for the repeaters are generated in accordance with and conform to the IS-95 CDMA standard. However, the identifier signals may also be generated to conform to some other CDMA standard or design.

In an embodiment, the identification codes for the repeaters comprise pseudo-noise (PN) sequences at defined offsets. In a typical CDMA system, each base station spreads its data with a PN sequence to generate a spread spectrum signal, which is then transmitted to the terminals (and possibly to a repeater). The PN sequence is also used to spread pilot data (typically a sequence of all zeros) to generate a pilot reference, which is used by the terminals to perform coherent demodulation, channel estimation, and possibly other functions.

Figure 2:
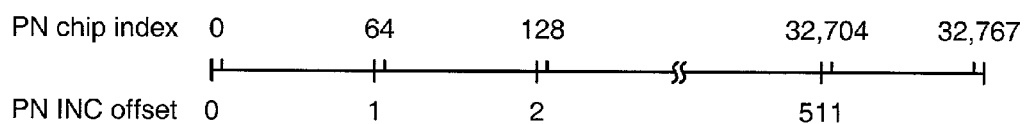
FIG. 2 is a diagram showing the indices for a PN sequence used to generate pilot references and to spread data at the base stations.

FIG. 2 is a diagram showing the indices for a PN sequence used to generate the pilot references and to spread data at the base stations. For IS-95 and some other CDMA systems, the PN sequence has a specific data pattern and a fixed length of 32,768 chips. This PN sequence is continually repeated to generate a continuous spreading sequence that is then used to spread pilot and traffic data. The start of the PN sequence is defined by the CDMA standard and is synchronized to a defined absolute time reference ($T_{ABS}$), which is also referred to as the system time. Each chip of the PN sequence is assigned a respective PN chip index, with the start of the PN sequence being assigned a PN chip index of 0 and the last chip of the PN sequence being assigned a PN chip index of 32,767.

The PN sequence may be partitioned into 512 different "PN INC offsets," numbered from 0 through 511, with consecutively numbered PN INC offsets being separated by 64 chips. Effectively, 512 different PN sequences may be defined based on the 512 different PN INC offsets, with each of the 512 PN sequences having a different starting point at the absolute time reference based on its PN INC offset. Thus, the PN sequence with a PN INC offset of 0 starts at PN chip index 0 at $T_{ABS}$, the PN sequence with a PN INC offset of 1 starts at PN chip index 64 at $T_{ABS}$, the PN sequence with a PN INC offset of 2 starts at PN chip index 128 at $T_{ABS}$, and so on, and the PN sequence with a PN INC offset of 511 starts at PN chip index 32,704 at $T_{ABS}$.

The 512 possible PN sequences may then be assigned to the base stations in the CDMA system and used, among other functions, to differentiate the base stations. Each base station is assigned a specific PN INC offset such that the pilot references from neighboring base stations can be differentiated, which then allow the terminals to identify each received base station by its PN INC offset.

The closest PN INC offsets that may be assigned to neighboring base stations are determined by the CDMA standards. For example, the IS-95 and IS-856 standards define a minimum value of one for the parameter "PN_INC". This specified PN_INC of one denotes that neighboring base stations may be assigned to PN sequences separated by a minimum PN INC offset of one (or 64 PN chips). A lower specified PN_INC value (e.g., one) results in more available PN offsets (e.g., 512) that may be assigned to the base stations. Conversely, a larger specified PN_INC value (e.g., four) results in fewer available PN offsets (e.g., 128) that may be assigned to the base stations.

In an aspect, PN sequences at specific offsets are used for repeater identification. As used herein, an "identifier PN" (IPN) is a PN sequence, a code, a bit pattern, or some other means, used for identifying repeater. Various PNs may be used as the identifier PNs. The identifier PNs may be categorized as follows:

Dedicated IPNs—one or more PN sequences at specific PN INC offsets are reserved for use for repeater identification;

Neighbor List IPNs—PN sequences for base stations in a neighbor list are used for repeater identification.

Each of these IPN categories corresponds to a different scheme used to select PN sequences for use as the identifier PNs. These IPN selection schemes are described in further detail below. Other schemes for selecting PN sequences for use as IPNs may also be contemplated, and this is within the scope of the invention.

For the dedicated IPNs scheme, one or more PN INC offsets out of the 512 possible PN INC offsets (if PN_INC of one is specified) or out of the 128 possible PN INC offsets (if PN_INC of four is specified) is dedicated for repeater identification. The PN sequence at each such dedicated PN INC offset may be used to identify repeaters.

The use of the identifier PN allows a terminal to unambiguously identify a repeater within a cell. If multiple repeaters are employed in a particular cell, then these repeaters may be assigned to the same or different identifier PNs, depending on various factors. In one embodiment, different identifier PNs at different PN INC offsets are assigned to the repeaters within the same cell. In another embodiment, different chip offsets of the same identifier PN are assigned to the repeaters within the same cell. These offsets are defined with respect to the system time as determined by the offset of the repeated PN. For example, if a 2-chip offset is used, then 11 different PN sequences can be generated from a single identifier PN within a 20-chip window. The PN sequences assigned to the repeaters within the same cell can thus have different PN INC or chip offsets with respect to each other to allow these repeaters to be specifically identified.

Figure 3:
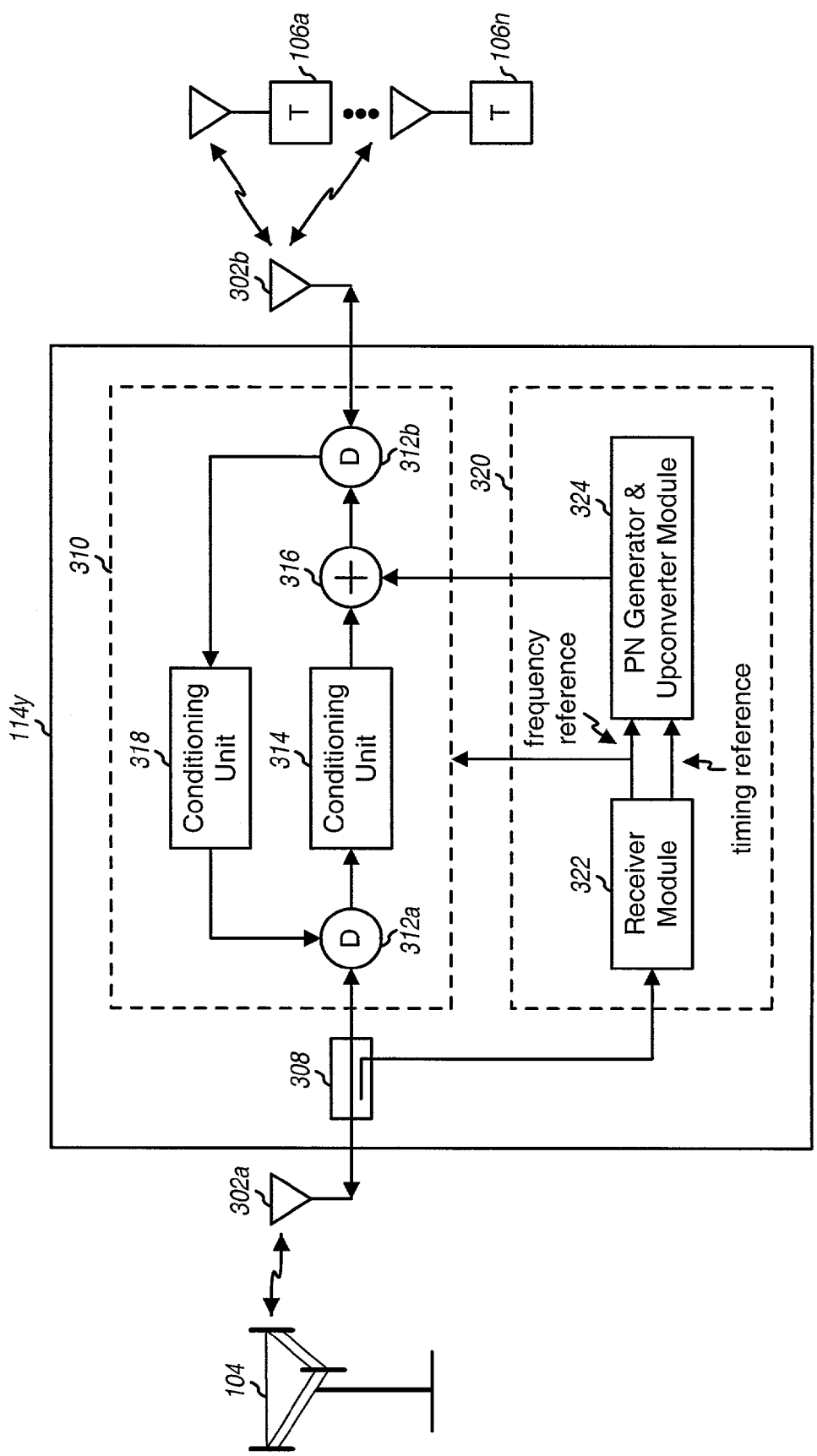
FIG. 3 is a diagram of an embodiment of a repeater capable of implementing one embodiment of the disclosed method and apparatus.

FIG. 3 is a diagram of an embodiment of a repeater 114$y$ capable of implementing various aspects and embodiments of the disclosed method and apparatus. Repeater 114$y$ is effectively a high-gain bi-directional amplifier used to receive, amplify, and retransmit modulated signals on both the forward and reverse links. On the forward link, a modulated signal from a serving base station 104 (which is also referred to as a "donor" cell or sector) is received by repeater 114$y$ via either a (e.g., directive) antenna or a (e.g., coaxial or fiber optic) cable. Repeater 114$y$ then filters, amplifies, and retransmits the forward modulated signal to terminals 106 within its coverage area. Correspondingly, on the reverse link, repeater 114$y$ receives modulated signals from the terminals within its coverage area, and conditions and retransmits the reverse modulated signals back to the serving base station.

In the specific embodiment shown in FIG. 3, repeater 114$y$ includes a repeater unit 310 coupled to an identifier signal generator 320. Repeater unit 310 performs the signal conditioning to generate the repeated signals for both the forward and reverse links. Identifier signal generator 320 generates one or more spread spectrum identifier signals that include the identification code (e.g., the identifier PN) assigned to repeater 114$y$.

In the embodiment shown, identifier signal generator 320 includes a receiver module 322 coupled to a PN generator and upconverter module 324. A coupler 308 provides a portion of the forward modulated signal from the serving base station to receiver module 322. Receiver module 322 processes the coupled portion of the forward modulated signal and provides a timing reference and a frequency reference, which are used to generate a spread spectrum identifier signal for repeater 114$y$. PN generator and upconverter module 324 generates the identifier PN for the repeater based on the timing reference and further upconverts the identifier PN to a proper intermediate frequency (IF) or radio frequency (RF), based on the frequency reference, to generate the spread spectrum identifier signal. The operation of identifier signal generator 320 is described in further detail below.

In the embodiment shown, repeater unit 310 includes a pair of duplexers 312$a$ and 312$b$ respectively coupled to antennas 302$a$ and 302$b$, which are used to communicate with the serving base station and the terminals, respectively.

Duplexer 312$a$ routes the forward modulated signal from the serving base station to a conditioning unit 314, and further couples the conditioned reverse modulated signals from a conditioning unit 318 to antenna 302$a$ for transmission back to the serving base station. Conditioning unit 314 conditions the forward modulated signal and provides a conditioned forward modulated signal to a combiner 316. The signal conditioning may include amplification, frequency downconversion of the forward modulated signal to intermediate frequency (IF) or baseband, filtering, and upconversion of the signal to IF or radio frequency (RF). Combiner 316 (which may be implemented with a hybrid coupler) further receives the spread spectrum identifier signal from identifier signal generator 320, combines the identifier signal with the conditioned forward modulated signal, and provides a combined signal to duplexer 312$b$. The combined signal is then routed to antenna 302$b$ and transmitted to the terminals.

As shown in FIG. 3, repeater unit 310 may receive the frequency reference from identifier signal generator 320. This frequency reference may be needed if the identifier signal is added at IF or baseband (BB). The frequency reference may be used to ensure that the IF/BB of the repeater is accurate. In this case, conditioning unit 314 receives the frequency reference and combiner 316 is included within conditioning unit 314.

On the reverse link, the reverse modulated signals from the terminals are received by antenna 302$b$, routed through duplexer 312$b$, and conditioned by conditioning unit 318. The conditioned reverse modulated signals are then routed through duplexer 312$a$ and transmitted to the serving base station via antenna 302$a$. In general, the processing of the forward and reverse modulated signals within repeater unit 310 are unaffected by the processing and addition of the spread spectrum identifier signal.

In the embodiment shown in FIG. 3, the identifier signal is added to the conditioned forward modulated signal (e.g., at either IF or RF) within repeater unit 310. In general, the identifier signal can be added at any point along the signal path from antenna 302$a$ to antenna 302$b$. For example, the identifier signal can be generated and added to the received forward modulated signal, and the combined signal can then be provided to repeater unit 310. Alternatively, the identifier signal can be added to the conditioned forward modulated signal from repeater unit 310 and the combined signal can then be transmitted from antenna 302$b$. The identifier signal can thus be added to the forward modulated signal either external to or within repeater unit 310. For a repeater already deployed in the field and which does not include the proper circuitry (e.g., combiner 316 in FIG. 3) to combine the identifier signal with the forward modulated signal, this function can be achieved external to the repeater. Also, coupler 308 may be located either before (at the input of) or after (at the output of) repeater unit 310. Alternatively, the coupled portion of the forward modulated signal may be obtained from within repeater unit 310 at RF, IF, or baseband, depending on the particular implementation of the repeater.

Figure 4A:
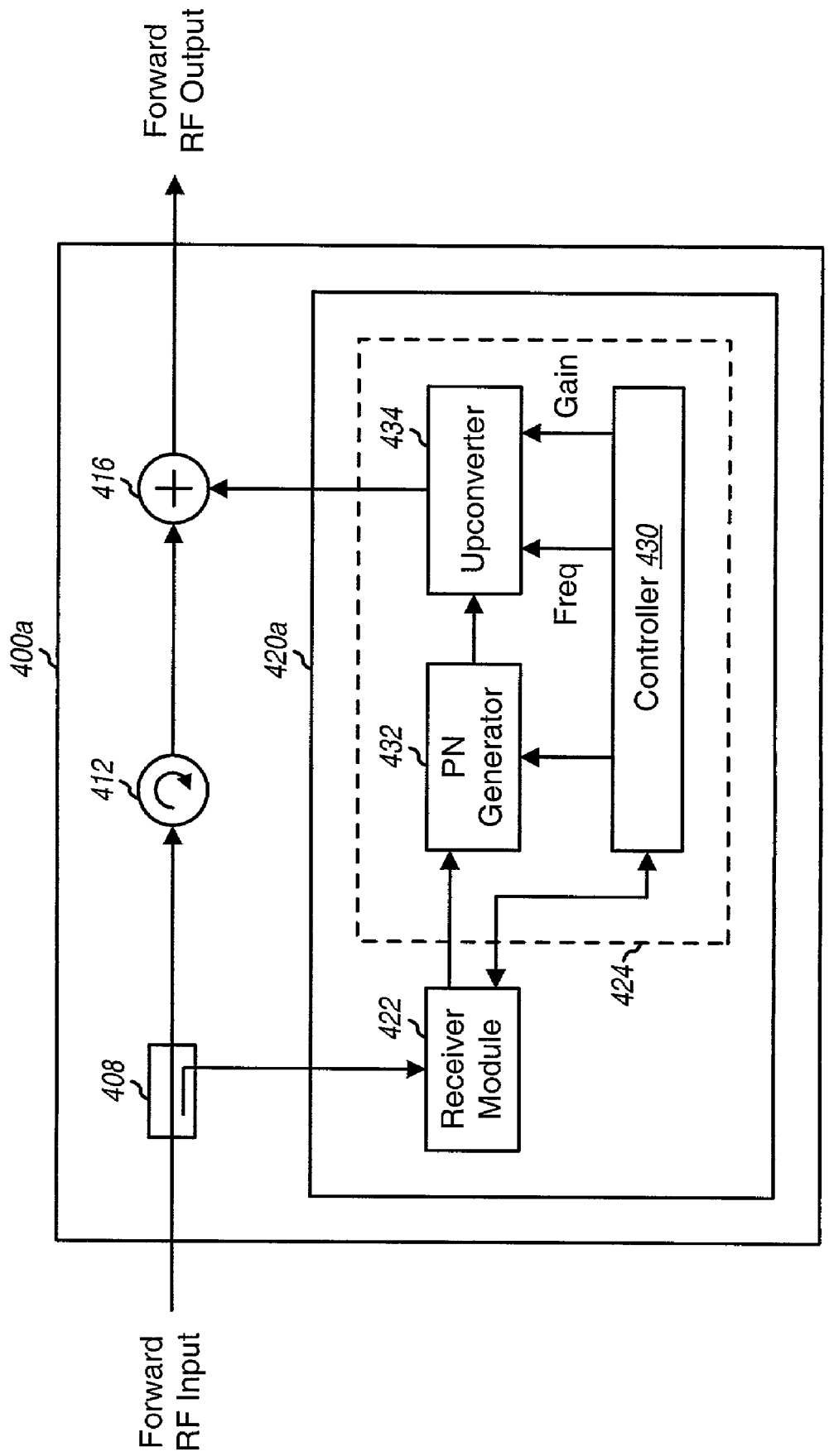
FIGS. 4A through 4C show three embodiments of a module that can be used to generate and combine an identifier signal with a forward modulated signal to provide a combined signal.

FIG. 4A shows an embodiment of a module 400$a$ that can be used to generate and combine an identifier signal with a forward modulated signal to provide a combined signal. Module 400$a$ can be implemented as a separate unit that couples to either the input port or the output port of a repeater unit. If coupled to the input port, the combined signal from module 400$a$ can be conditioned and retransmitted by the repeater unit in similar manner as for a forward modulated signal. And if coupled to the output port, the identifier signal can be combined with the conditioned forward modulated signal from the repeater unit to generate a combined signal for transmission to the terminals. In either case, the repeater unit can be operated in the normal manner, as if the identifier signal was not present.

In the embodiment shown in FIG. 4A, within module 400a, the forward modulated signal (i.e., forward RF input) is coupled through a coupler 408, routed through an isolator 412, and provided to a combiner 416, which may be implemented with a hybrid coupler. Combiner 416 also receives an identifier signal from an identifier signal generator 420a, combines the forward modulated signal with the identifier signal, and provides the combined signal to the output (i.e., forward RF output).

FIG. 4A also shows an embodiment of identifier signal generator 420a, which may also be used for identifier signal generator 320 in FIG. 3. The coupled portion of the forward modulated signal is provided to a receiver module 422 and processed to provide the timing and frequency references, as noted above. In an embodiment, receiver module 422 includes a receiver processing unit similar to that included in a terminal and which is capable of demodulating the forward modulated signal from the serving base station. In particular, receiver module 422 filters, amplifies, downconverts, and digitizes the forward modulated signal to provide samples. The samples are then despread with a locally generated PN sequence at various chip offsets to recover a pilot reference transmitted by the serving base station.

Pilot searching and demodulation is well known, as demonstrated in U.S. Pat. No. 5,764,687, entitled "MOBILE DEMODULATOR ARCHITECTURE FOR A SPREAD SPECTRUM MULTIPLE ACCESS COMMUNICATION SYSTEM"; U.S. Pat. Nos. 5,805,648 and 5,644,591, both entitled "METHOD AND APPARATUS FOR PERFORMING SEARCH ACQUISITION IN A CDMA COMMUNICATIONS SYSTEM"; and U.S. Pat. No. 5,577,022, entitled "PILOT SIGNAL SEARCHING TECHNIQUE FOR A CELLULAR COMMUNICATIONS SYSTEM."

In an embodiment, receiver module 422 includes a timing tracking loop and a carrier tracking loop (not shown in FIG. 4A for simplicity). The frequency tracking loop locks the frequency of a local reference oscillator (e.g., a temperature compensated crystal oscillator TCXO)) to the frequency of the pilot reference in the received forward modulated signal (i.e., the signal to be repeated). The timing reference can then be derived by detecting the start of the PN sequence extracted from the recovered pilot reference. The timing reference may be provided by receiver unit 422 via a timing signal having a pulse coincidental with a deterministic periodic offset from the system time (as derived from the recovered pilot reference), which allows alignment of the identifier PN to the system time.

The carrier tracking loop locks a local oscillator (LO) to the carrier frequency of the forward modulated signal. The frequency reference can then be derived from the locked local oscillator. The frequency reference may be provided via a clock signal having a frequency that is related to (e.g., 1/N times) the frequency of the recovered carrier.

In the embodiment shown in FIG. 4A, a PN generator and upconverter module 424 includes a controller 430, a PN generator 432, and an upconverter 434. PN generator 432 receives the timing reference from receiver module 422 and may further be provided with other signals that may be required for the generation of the identifier PN. For example, PN generator 432 may be provided with a clock signal at multiple times the PN chip rate (e.g., a clock signal at 16 times the chip rate, or Chip×16) and another signal with the number of Chip×16 cycles within a particular time period (e.g., 2 seconds). PN generator 432 then generates one or more identifier PNs at the desired offset depending on the particular implementation, and may further perform pulse shaping of each identifier PN using a digital filter to generate a properly wave-shaped PN sequence.

Upconverter 434 receives the frequency reference from receiver module 422 and the (wave-shaped) identifier PN from PN generator 432 and generates one or more spread spectrum identifier signals, with each identifier signal corresponding to a different carrier frequency and/or PN offset. Multiple identifier signals may be required for certain applications, as described below. Using the frequency reference from receiver module 422, each identifier signal can be provided at a carrier frequency that has negligible frequency error (e.g., a few Hertz or less) with respect to the forward modulated signal being retransmitted. The negligible frequency error allows the terminals to receive the identifier signal and recover the identifier PN even when they are locked to the forward modulated signal. The generation of the identifier signal may be performed digitally, using a combination of analog and/or digital circuits, or via some other manner.

Controller 430 can communicate with receiver module 422, PN generator 432, and upconverter 434 for various functions. For example, controller 430 may direct receiver module 422 to lock to a particular one of a number of forward modulated signals being received, to search for the forward modulated signal within a particular frequency window, and so on. Controller 430 may direct PN generator 432 to generate the identifier PN at a particular offset that has been assigned to the repeater. Controller 430 may further direct upconverter 434 to generate the identifier signal at a particular carrier frequency and at a particular transmit power level.

In an embodiment, the power level of each identifier signal is controlled such that it does not impact the capacity of the system. For a CDMA system, each transmitted signal (e.g., the identifier signal) acts as interference to the other transmitted signals (e.g., the forward modulated signal) and can degrade the quality of these other transmitted signals, as received at the terminals. The degradation in signal quality may then impact the transmission capacity of the forward link. To minimize this degradation, the power level of the identifier signal may be controlled to be a particular level (e.g., 15 dB) below the total signal power of the forward modulated signal being repeated. The identifier signal's power level is also controlled to be within the range of reception of most terminals. This then ensures that the identifier signal can be properly received by the terminals.

In an embodiment, only one identifier PN is used to specifically identify each repeater regardless of the number of forward modulated signals being retransmitted by the repeater. However, multiple identifier signals may be generated by module 400a for a number of reasons. For example, if a forward modulated signal is to be retransmitted over multiple frequency bands, then the identifier PN can be upconverted to a number of carrier frequencies corresponding to those of the repeated signals. Multiple identifier signals may also be generated digitally, for example, at a low IF (e.g., 10 MHz) and thereafter upconverted to the desired RF or IF. Since the identifier PN is used for repeater identification and not for base station identification, only one identifier PN is assigned to each repeater even though multiple forward modulated signals from multiple base stations may be repeated.

Figure 4B:
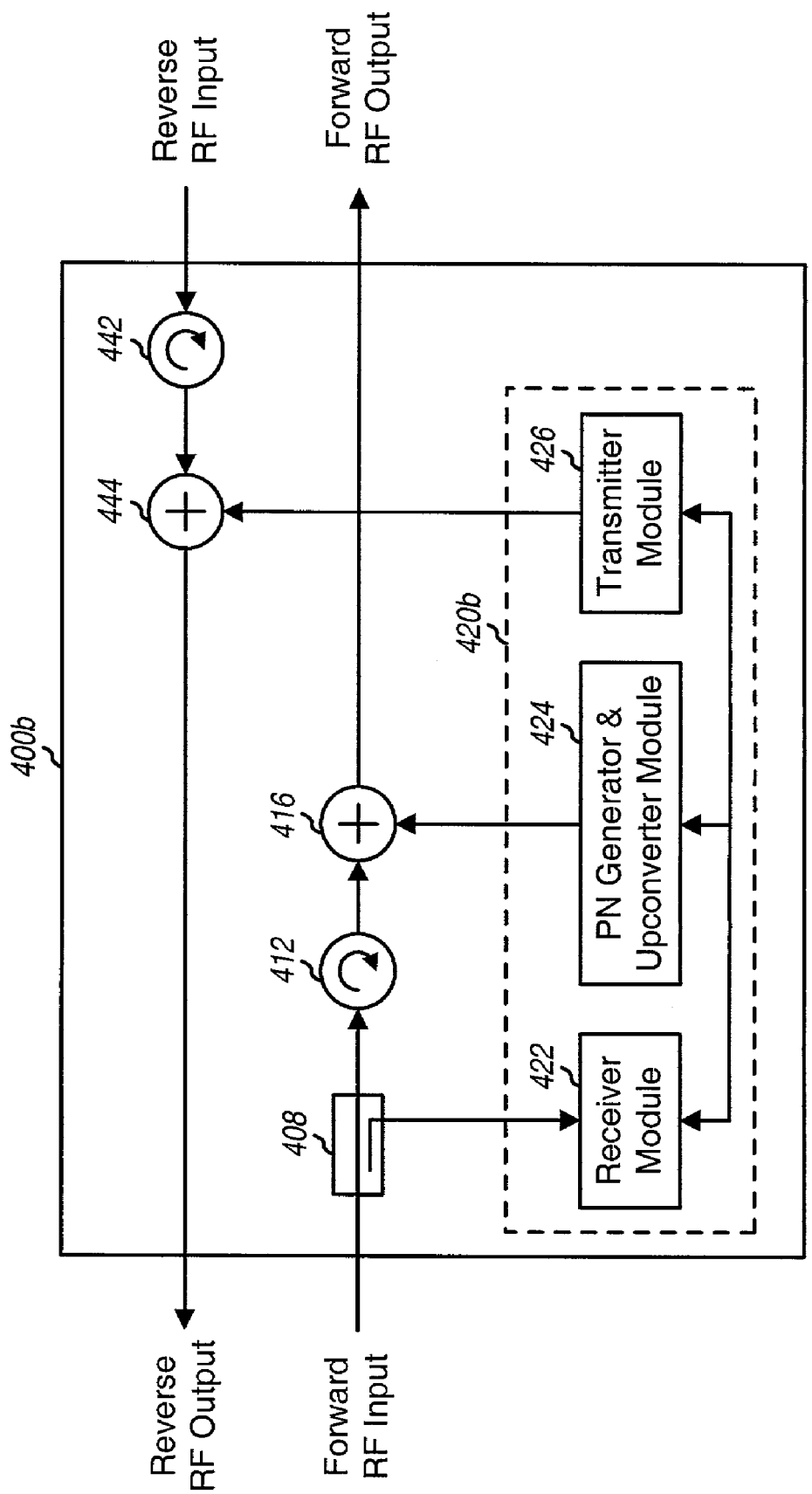

FIG. 4B shows an embodiment of another module 400b that can be used to generate and combine an identifier signal with a forward modulated signal to provide a combined signal. Module 400b is similar in certain aspects to module 400a in FIG. 4A, but further includes a transmitter module 426 used to provide acknowledgment for remote configuration via the reverse modulated signals. Remote configuration of the repeater may be performed, for example, by the PDE. In this case, transmitter module 426 may be used to send information back to the PDE regarding configuration. This information may comprise an acknowledgment of a command sent by the PDE to change the identifier signal (e.g., the offset and/or relative power of the identifier signal). This feedback from the repeater would then allow the PDE to monitor and verify such remote configuration. The location of combiner 416 and isolator 412 may be swapped, which would then allow receiver module 422 to self-monitor the identifier signal. In this way, receiver module 422 is able to receive the identifier signal, similar to a terminal, thus enabling the monitoring of the signal that is added.

Figure 4C:
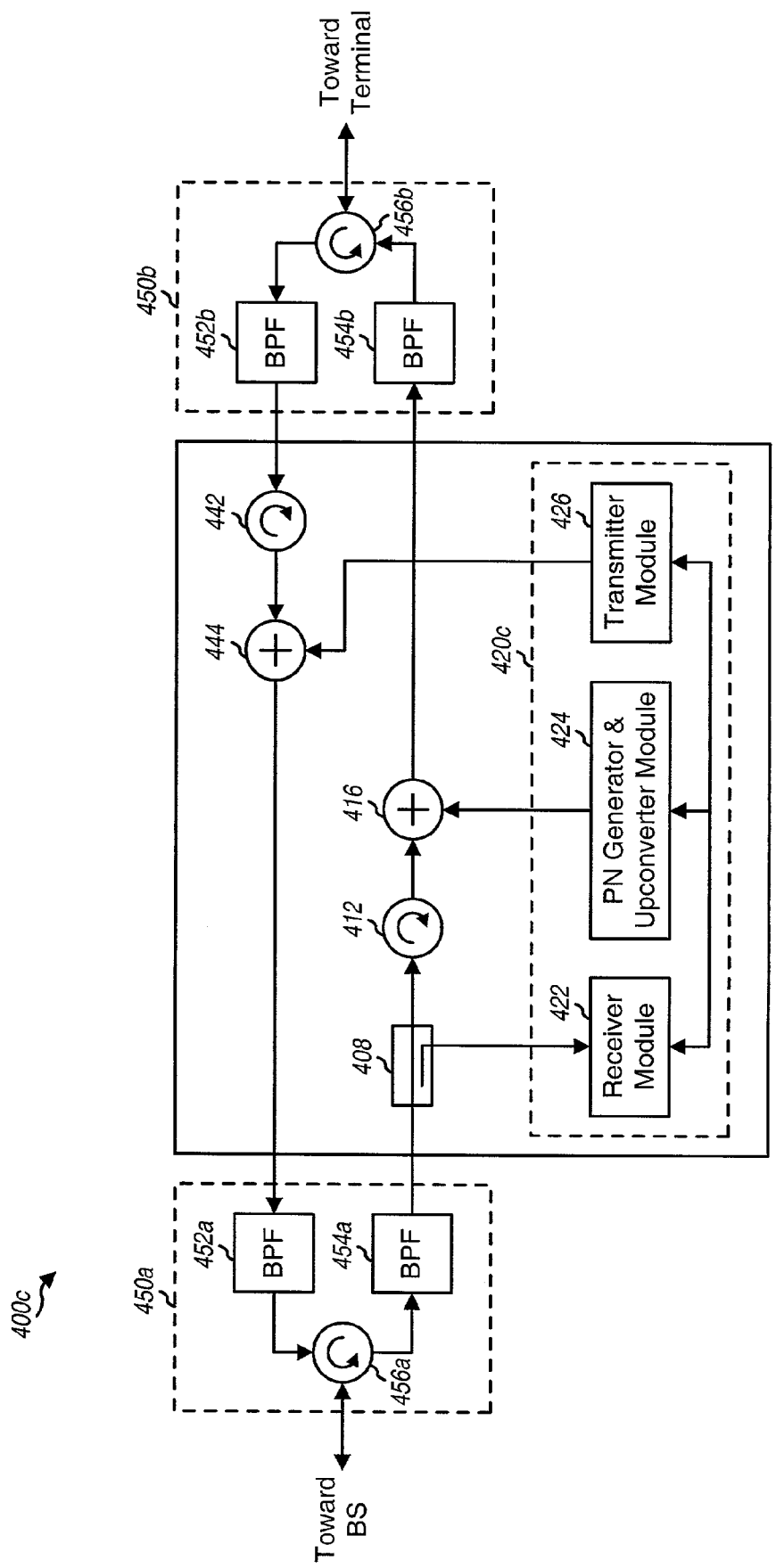

FIG. 4C shows an embodiment of yet another module 400c that can be used to generate and combine an identifier signal with a forward modulated signal to provide a combined signal. Module 400c is similar in certain aspects to module 400b in FIG. 4B, but further includes units 450a and 450b used to combine the forward and reverse modulated signals at the input and output ports, respectively, of module 400c such that a single cable may be used at each port for both the forward and reverse links. In the embodiment shown, each unit 450a and 450b includes a pair of bandpass filters (BPF) 452a and 452b and 454a and 454b, respectively, used to filter the reverse and forward modulated signals, respectively. A circulator 456 routes the forward and reverse modulated signals to their proper destinations and further provides isolation for the forward and reverse links. Units 450a and 450b may each also be implemented with a duplexer.

Figure 1B:
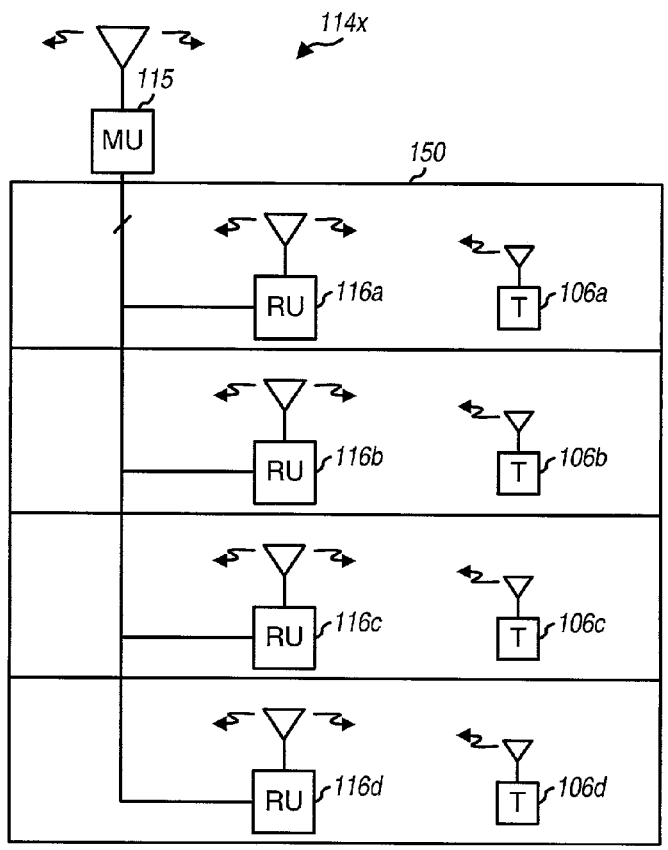
FIG. 1B is a diagram illustrating the use of a repeater to provide coverage for a building.

A repeater may be associated with a number of remote units (RUs) used to provide coverage for their respective areas. For the indoor application shown in FIG. 1B, repeater 114x includes a main unit 115 and a number of remote units 116, with each remote unit providing coverage for a respective floor of a building. The identifier signals to be transmitted by the remote units may be generated in numerous ways and based on various considerations (e.g., whether or not the remote units need to be individually identified).

FIGS. 5A through 5D illustrate some specific implementations for the generation of the identifier PN for multiple remote units of a repeater. For certain CDMA systems (such as those that conform to IS-95 CDMA standard), a terminal reports only the earliest arriving pilot signal (i.e., the first signal instance that can be used for demodulation) with respect to a reference time. Currently, IS-801 standard also supports reporting only the earliest arriving pilot. The pilot signal is essentially the PN sequence since the pilot data is a sequence of all zeros or all ones. For these systems, a specific offset for the identifier PN may be assigned to each remote unit such that the remote unit may be specifically identified, as described below. For other systems that may support the reporting of multiple pilots (i.e., a pilot profile), a reported pilot profile may also be used to specifically identify the remote units. FIGS. 5A through 5D show examples of cases for illustration. The concepts described herein may be expanded and/or modified for other cases, and this is within the scope of the disclosed method and apparatus.

The repeated signals transmitted from the remote units of a particular repeater are typically delayed such that these repeated signals are not received by a terminal at equal power and delay but opposite phase, in which case they would cancel. Since the areas covered by the remote units are typically small, a delay of two chips between remote units is normally adequate.

In the following description for FIGS. 5A through 5D, it is assumed that dedicated IPNs are used for repeater identification. For the concepts described with reference to FIGS. 5A through 5D, the extension to incorporate neighbor list IPNs is then subsequently described.

Figure 5A:
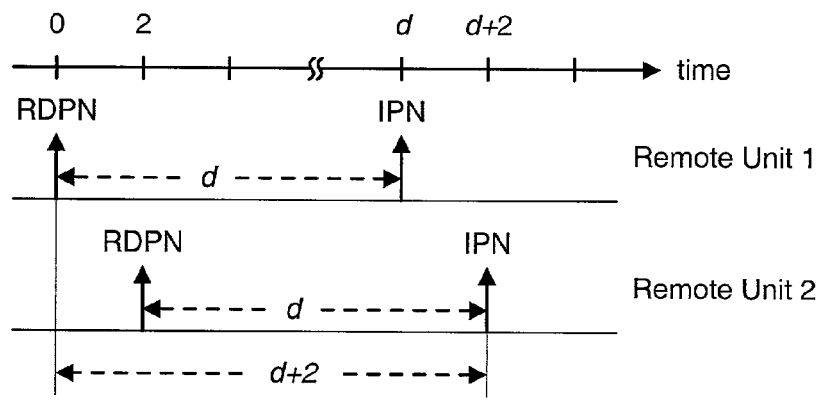
FIG. 5A is a diagram showing the signals that may be received from the remote units of a particular repeater.

FIG. 5A is a diagram showing the signals that may be received from the remote units of a particular repeater. As shown in FIG. 5A, the identifier PN is delayed from the repeated donor PN (RDPN) (i.e., the PN from the donor base station that is repeated) by a deliberate offset of d, and the repeated and identifier signals for each remote unit are delayed by two chips relative to each other. If a terminal receives only the signals from the repeater (i.e., one or more remote units of the repeater) and not from the donor base station, then the terminal will report the delay (or offset) of the identifier PN, with respect to the repeated donor PN, in the following range:

$$R_{RIPN} \in [d; 2(n-1)+d]. \quad \text{Eq (1)}$$

Equation (1) indicates that the offset of the earliest identifier PN reported by the terminal will fall within the range from d (if the repeated and identifier signals from the first remote unit are received) to $2(n-1)+d$ (if the repeated signal from the first remote unit and the identifier signal from the n-th remote unit are received). The reason for the range of possible offsets, $R_{RIPN}$, is because the terminal reports the earliest received identifier PN and the earliest received repeated and identifier signals may come from the same or different remote units.

Figure 5B:
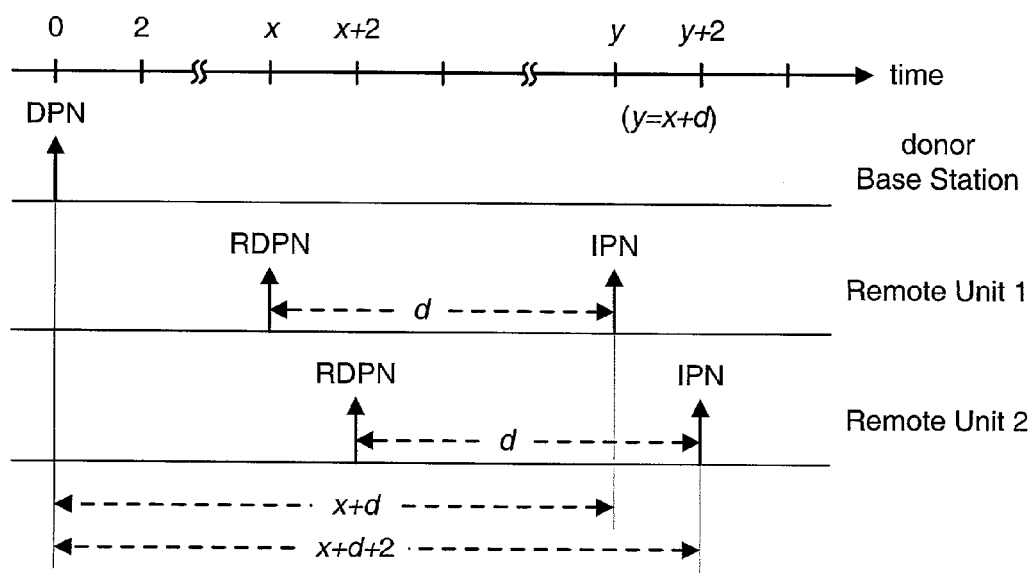
FIG. 5B is a diagram showing the signals that may be received from a donor base station and the remote units of a particular repeater.

FIG. 5B is a diagram showing the signals that may be received from a donor base station and the remote units of a particular repeater. If the terminal is able to receive the forward modulated signal directly from the donor base station as well as the repeated signal from the repeater, then the terminal will report the donor PN (DPN) received from the base station and the earliest identifier PN for the repeater. The offset of the identifier PN relative to donor PN would then fall in the following range:

$$R_{IPN} \in [d+x; 2(n-1)+d+x], \quad \text{Eq (2)}$$

where x is the delay between the donor base station and the first (earliest) remote unit for the repeater.

From equations (1) and (2), it can be noted that the deliberate offset d for the identifier PN is common to both ranges, $R_{RIPN}$ and $R_{IPN}$. If the delay x between the donor base station and the earliest remote unit meets the condition x>2n, then whether the terminal receives the forward modulated signal from the donor base station or the repeater can be determined. This information may be useful in certain cases, for example, when the terminal is located within the coverage of a repeater but is still able to receive the signal from the donor base station, or when the terminal is located away from the repeater's coverage area but still receives leakage from the repeater.

In certain embodiments, multiple identifier signals may be generated based on different chip offsets of a single identifier PN. This may be desirable, for example, if different identifier signals are required to individually identify each of the multiple remote units of a repeater. In this case, one identifier signal may be generated for each remote unit, with each identifier signal including the identifier PN at a particular chip offset assigned to that remote unit. The use of different chip offsets for the identifier signals for different remote units allows for more specific estimation of a terminal's location. For example, different chip offsets can be used to estimate the position of a terminal to within the coverage area of a particular remote unit (e.g., a particular floor of the building) as opposed to the coverage area of the main unit (e.g., a particular building).

Figure 5C:
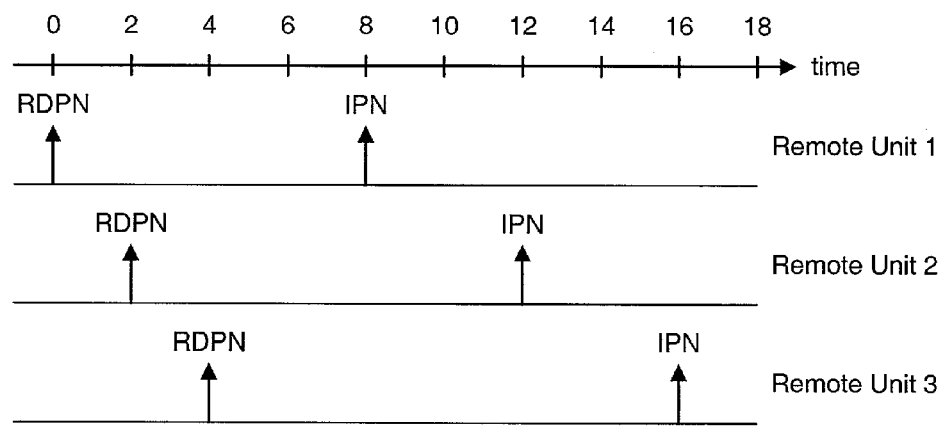
FIGS. 5C and 5D are diagrams showing the identifier signals for multiple remote units, which are delayed by different chip offsets derived based on two different schemes.

FIG. 5C is a diagram showing the identifier signals for multiple remote units, which are delayed by linearly increasing chip offsets. The delays for the identifier signals may be additional to the delays for the repeated signal. For example, if the repeated signals for the remote units are delayed by two chips, then the identifier signals for the remote units may be delayed by four chips. In an embodiment, the chip offsets assigned to the remote units are defined as follows:

$$d_{IPN}(i)=d+2(i-1), \ 1 \leq i \leq n \qquad \text{Eq (3)}$$

where $d_{IPN}(i)$ is the offset assigned to the i-th remote unit and d is the offset of the identifier PN relative to the repeated donor PN for the first remote unit (i.e., $d=d_{IPN}(1)$). As a specific example shown in FIG. 5C, if the repeated signals for the remote units are delayed by two chips, d=8, and n=3, then the offsets $d_{IPN}(i)$ for the three remote units can be computed as {8, 10, 12}.

By using different offsets for the remote units, if the repeated and identifier signals from only one remote unit are received by the terminal at any given moment, then that remote unit can be specifically identified by the offset between the repeated and identifier signals.

Multiple identifier signals at different chip offsets may be generated (e.g., by the main unit) by delaying the identifier signal (e.g., at IF or RF) with filters of different delays, by generating PN sequences with different chip offsets and upconverting these PN sequences, or by some other mechanism.

Figure 5D:
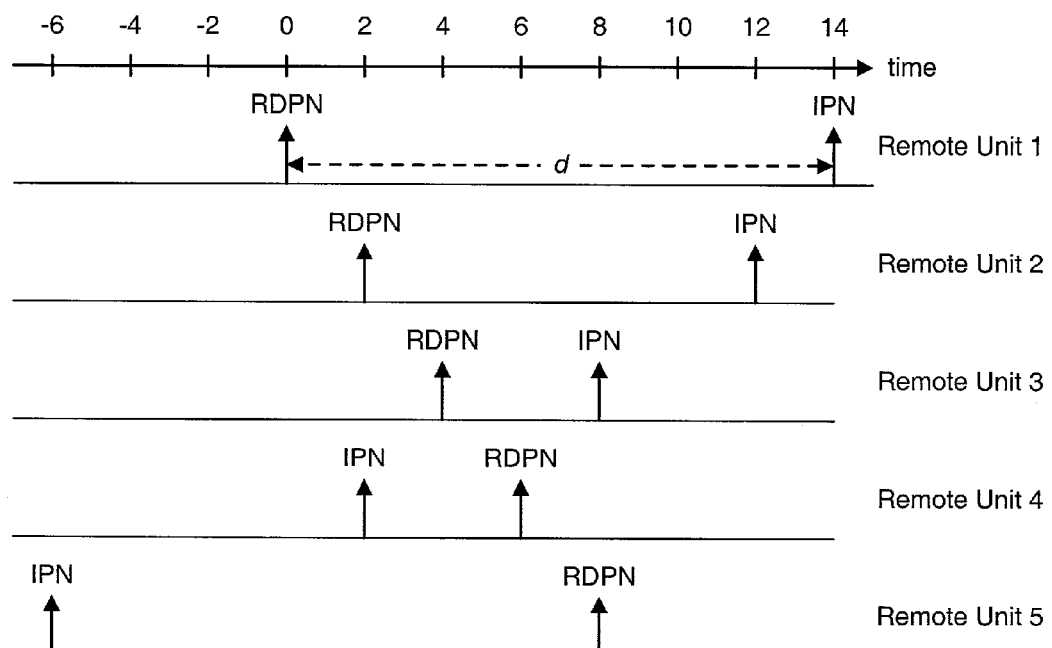

FIG. 5D is a diagram showing the identifier signals for multiple remote units, which are delayed by non-linearly decreasing chip offsets. In an embodiment, the chip offsets assigned to the remote units are defined as follows:

$$d_{IPN}(i)=d-(i-1)\cdot(i+2), \ 1 \leq i \leq n \qquad \text{Eq (4)}$$

where $d_{IPN}(i)$ is the offset assigned to the i-th remote unit and d is the offset of the identifier PN relative to the repeated donor PN for the first remote unit (i.e., $d=d_{IPN}(1)$). As a specific example shown in FIG. 5D, if the repeated signals for the remote units are delayed by two chips, d=14, and n=5, then the offsets $d_{IPN}(i)$ for the five remote units can be computed as {14, 10, 4, −4, −14}.

The different offsets generated by equation (4) allows for the identification of the specific remote unit from which an identifier signal is detected (if only one remote unit is received) or the two (or more) remote units from which the identifier signals are detected (if two or more remote units are received). Table 1 lists the possible offset measurements by the terminal (in column 1), the remote units that may be detected for the measured offsets (in column 2), and the reported remote units (in column 3).

TABLE 1

| Measured Offset | Remote Units (RUs) Detectable by the Terminal | Decision |
|---|---|---|
| d | RU1 | RU1 |
| d-2 | (RU1, RU2) | (RU1, RU2) |
| d-4 | RU2 | RU2 |
| d-6 | (RU1, RU3), optional RU2 | (RU1, RU3) |
| d-8 | (RU2, RU3) | (Ru2, RU3) |
| d-10 | RU3 | RU3 |
| d-12 | (RU1, RU4), optional RU2, RU3 | (RU1, RU4) |
| d-14 | (RU2, RU4), optional RU3 | (RU2, RU4) |
| d-16 | (RU3, RU4) | (RU3, RU4) |
| d-18 | RU4 | RU4 |
| d-20 | (RU1, RU5), optional RU2, RU3, RU4 | (RU1, RU5) |
| d-22 | (RU2, RU5), optional RU3, RU4 | (RU2, RU5) |
| d-24 | (RU3, RU5), optional RU4 | (RU3, RU5) |
| d-26 | (RU4, RU5) | (RU4, RU5) |
| d-28 | RU5 | RU5 |

The remote units reported in Table 1 ((in column 3) may be derived as follows. For an even value of d (e.g., d=14 for the example shown in FIG. 5D), the measured offset of the identifier PN relative to the repeated donor PN is first rounded to the nearest value and denoted as $\tilde{d}_{IPN}$. The remote unit(s) from which identifier signal(s) are received may then be identified as:

$$\begin{cases} RUi & \text{for } \tilde{d}_{IPN} = d-(i-1)\cdot(i\_2), & 1 \leq i \leq n \\ (RUi, RUj) & \text{for } \tilde{d}_{IPN} = d-(j-1)\cdot(j+2)+2(j-i), & 2 \leq j \leq n, 1 \leq i \leq n \end{cases} \qquad \text{Eq (5)}$$

For an odd value of d, the measured offset of the identifier PN is rounded to the nearest odd number, and the remote unit(s) are then identified in similar manner based on equation (5).

If multiple repeaters are used for a given coverage area of a donor PN (e.g., a sector or an omni-cell), with each repeater possibly having multiple remote units, then the range of offsets reported by a terminal for each repeater may be expressed as:

$$R_k \in R_{k,RIPN} \cup R_{k,IPN}, \qquad \text{Eq (6)}$$

where $R_k$ is the range of offsets that may be reported for the k-th repeater, $R_{k,RIPN}$ is the range of offsets if the k-th repeater is received but the donor base station is not received, $R_{k,IPN}$ is the range of offset if both the k-th repeater and the donor base station are received, and "∪" is a union operation.

If $x_k=2(n_k+1)$, then the range $R_k$ may be expressed as:

$$R_k \in [d_k; \ d_k+4 \cdot n_k], \qquad \text{Eq (7)}$$

where $d_k$ is the deliberate offset between the identifier PN and the repeated PN for the k-th repeater, and $n_k$ is the number of remote units for the k-th repeater. Equation (7) is derived from equations (1), (2), and (6). The start of range $R_k$ is the lower value in equation (1) (i.e., d) and the end of the range is given by the upper value in equation (2) (i.e., 2(n−1)+d+x). By substituting x=2(n+1) and keeping the condition x>2n, the end of range $R_k$ is then computed as 4n+d, as shown in equation (7).

The delays $d_k$ are selected such that the following is satisfied:

$$d_{k+1} = d_k + 4 \cdot n_k + 2. \qquad \text{Eq (8)}$$

If equation (8) is satisfied, then the repeater from which a repeated signal is received at the terminal may be specifically identified. The delay $d_1$ may be selected such that the identifier signals are within a search window used to search for pilots.

In general, if a range of offsets is used for the identifier signals, then the terminal is provided with the range information so that the search window can be appropriately set.

If multiple repeaters are used for a coverage area, then multiple PNs may also be used to individually identify each repeater. Each repeater may be assigned a respective identifier PN. A repeater may also be assigned two or more identifier PNs. For example, if two identifier PNs are available, then the first identifier PN may be assigned to a first repeater, the second identifier PN may be assigned to a second repeater, and the combination of the first and second identifier PNs may be assigned to a third repeater. Numerous combinations of offsets of these identifier PNs may also be generated and used.

In a typical CDMA system, each base station may be associated with a respective neighbor list, which includes nearby base stations that are candidates for handoff. The terminal may be provided with the neighbor list associated with the base station with which it communicates. The terminal may consult this neighbor list as it continually searches for strong signal instances (or multipath components) to determine whether or not handoff is required.

For the neighbor list IPN scheme, PN sequences used by base stations in the neighbor list (i.e., neighbor list PNs) are also used for repeater identification. Various considerations may be taken into account in the selection of the neighbor list PNs to be used for IPNs, the transmission of the IPNs, and the use of IPN measurements. These considerations ensure that the measurements of the IPNs are distinguishable from the measurements of the neighbor list PNs that are used for the IPNs. If these considerations are properly addressed, then the usage of the neighbor list IPNs is similar to that of the dedicated IPNs, which is described above.

Certain selection criteria may be used to determine which neighbor list PNs may be used for IPNs. In one criterion, neighbor list PNs that are repeated are not used for IPNs. If such a constraint is not imposed, then a terminal may receive the same PN as both (1) the repeated donor PN from one repeater and (2) the IPN from another repeater. Since the terminal reports a single measurement for each PN, corresponding to the earliest arriving path, there may be ambiguity as to whether the reported PN was from one or the other repeater. In another criterion, for a given donor base station associated with one or more repeaters, only PNs in the neighbor list for this base station that are not detectable at any of the associated repeaters may be use as IPNs for these repeaters. This constraint may be ensured, for example, by obtaining a PN search result from a unit located at each repeater and used to remotely configure and generate the IPNs.

The IPNs should be transmitted at a particular power level such that these IPNs may be reliably detected at the terminal while minimizing the impact on communication and system performance. As one consideration, the IPN should be transmitted at a sufficiently low power level so that it will not be added to the terminal's candidate list. As a specific example, the IPN may be transmitted at 15 dB below the power of the repeated donor PN. For a lightly loaded cell with repeated pilot Ec/Io of −5 dB, the IPN may be transmitted with a power corresponding to an Ec/Io of −20 dB.

For an IS-95A network, which has a low threshold value (T_ADD) for adding a new base station to the candidate list, the IPN may be transmitted at a lower power level. The extra margin may then reduce the likelihood of the IPN measurement being bumped up by noise (since pilot power may be estimated by a short integration period) and exceeding the T_ADD value. For an IS-95B network, which has a "dynamic" add threshold value, the large difference in pilot powers of the repeated donor PN and the IPN should result in a low likelihood of the IPN being added to the candidate list.

In certain instances, a terminal may be in a handoff region between (1) a repeater transmitting a donor PN and an IPN and (2) the neighbor base station whose PN is used as the IPN by the repeater. The PN from the neighbor base station is referred to as the "neighbor PN" (NPN). In these instances, the terminal may attempt to (non-coherently) combine the transmission from the donor base station with the transmission from the neighbor base station to improve demodulation performance. In that case, the terminal may view the IPN as another multipath component of the neighbor base station and would attempt to combine the non-existent traffic channel associated with the IPN (since only the IPN is transmitted from the repeater) with the traffic channel of the neighbor base station.

The effect of combining the non-existent traffic channel associated with the IPN with the traffic channel of the neighbor base station may be negligible for the following reasons. First, the probability of the terminal being in handoff between the repeater and this neighbor base station may be small, if the IPN selection criteria described above are adhered to. Second, the likelihood of the IPN being selected for combining may also be small. To be selected for combining, the IPN pilot power may need to exceed an in-lock threshold. However, the IPN pilot power is relatively weak (e.g., 15 dB below the repeated donor PN pilot power). Thus, the IPN would pass the in-lock threshold only if the repeated donor PN is received at a strong level by the terminal. Third, the contribution from the IPN may be small even if it is combined. Since only the pilot and no traffic channels are transmitted by the repeater for the IPN, only noise detected for the non-existent traffic channel would be combined. However, this noise would be attenuated by a large amount. For maximum ratio combining (which is commonly used with rake receivers), the traffic channel from each finger is weighted by the pilot power received by that finger prior to the combining. Since the IPN pilot power is relatively weak (e.g., 15 dB or more below the maximum power for the fingers), the noise from the IPN would be weighted with a small value. Fourth, the IPN will only be combined if there are spare fingers available to track the relatively weak multipath component for the IPN.

If the IPNs for repeaters are selected from the neighbor list PNs, then it may be necessary to determine whether signals (or PNs) are received directly from the base stations or via the repeaters. In an embodiment, this determination may be made based on geometric constraints.

Figure 6A:
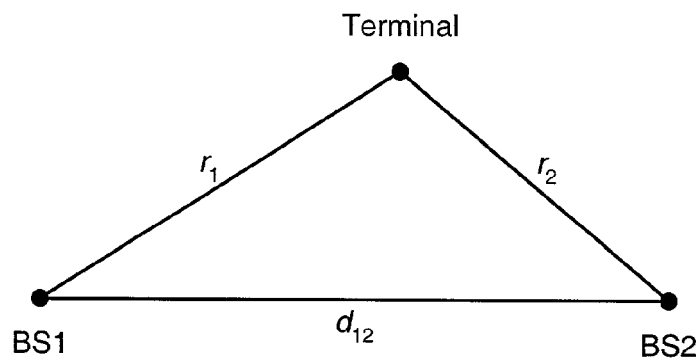
FIG. 6A is a diagram illustrating geometric constraint for time difference of arrival (TDOA) measurement.

FIG. 6A is a diagram illustrating a geometric constraint for a time difference of arrival (TDOA) measurement. In FIG. 6A, the terminal receives pilots from two base stations, and the two received pilots are used to derive a single TDOA measurement. The TDOA measurement is indicative of the difference in the arrival times of the two received pilots, and the arrival time of a signal is proportional to the distance that the signal travels. The distances between the terminal and the two base stations are denoted as $r_1$ and $r_2$, and the distance between the two base stations is denoted as $d_{12}$. From FIG. 6A, it can be seen that the distances $r_1$, $r_2$, and $d_{12}$ form a triangle. The following constraint may then be formed:

$$-d_{12} \leq (r_1 - r_2) \leq d_{12}. \qquad \text{Eq (9)}$$

A geometric test may be devised based on the geometric constraint expressed in equation (9).

Equation (9) indicates that, assuming no receiver timing and estimation error, the absolute value of each TDOA measurement (i.e., $|r_1 - r_2|$) is upper bounded by the distance $d_{12}$ between the two base stations. Thus, geometric constraints for TDOA measurements may be used (1) to determine excess delay on the TDOA measurements and/or (2) to determine whether or not pilots are delayed by repeaters.

The IPN for each repeater may be delayed relative to the repeated donor signal by an amount that is greater than the distance between the donor and neighbor base stations plus some margin. This may be expressed as:

$$r_{ipn} - r_{rdpn} > d_{dn} + d_{mar}, \text{ or } r_{ipn} > r_{rdpn} + d_{dn} + d_{mar}, \qquad \text{Eq (10)}$$

where $r_{ipn}$ is the IPN measurement from the repeater;

$r_{rdpn}$ is the RDPN measurement from the repeater;

$d_{dn}$ is the distance between the donor base station and the neighbor base station whose PN is used as the IPN; and $d_{mar}$ is the margin.

Geometric constraints for TDOA measurements may be used to determine whether or not a signal received at the terminal is from a repeater. The non-repeated donor PN (DPN), the non-repeated neighbor PN (NPN), the repeated donor PN (RDPN), and the IPN, or any combination of these PNs, any be detected by the terminal, as described in the following scenarios.

Figure 6B:
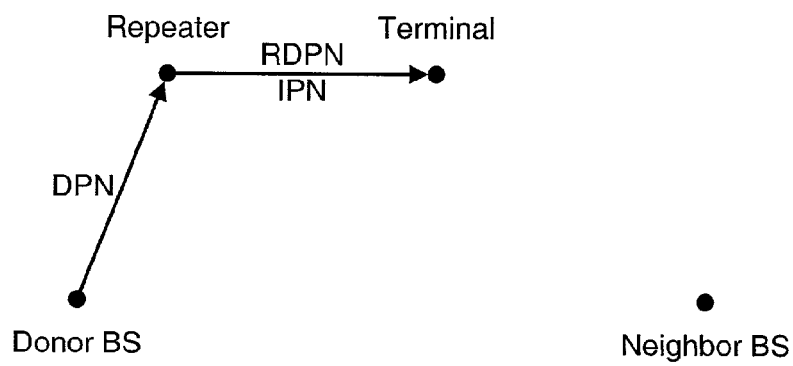
FIGS. 6B through 6E are diagrams illustrating four different scenarios for the terminal based on use of neighbor list PNs for identifier PNs.

FIG. 6B is a diagram illustrating a scenario whereby the terminal is under the repeater coverage area. For this scenario, the terminal receives the RDPN and the IPN from the repeater, but not the DPN or NPN. The terminal may then report the RDPN and IPN to the PDE, which may perform the geometric test. The TDOA measurement between the RDPN and IPN should be accurate, since these PNs are transmitted from the same source. If the IPN is delayed by at least $d_{dn} + d_{mar}$ relative to the RDPN, as shown above in equation (10), then the geometric test for the RDPN and IPN measurements would fail because the difference between the IPN measurement and the RDPN measurement would be greater than the distance between the donor and neighbor base stations by at least the margin (i.e., $r_{ipn} - r_{rdpn} > d_{dn} + d_{mar}$). The geometric test failure may be used as an indication that the IPN was received from the repeater, and not from the neighbor base station whose PN is used as the IPN.

Figure 6C:
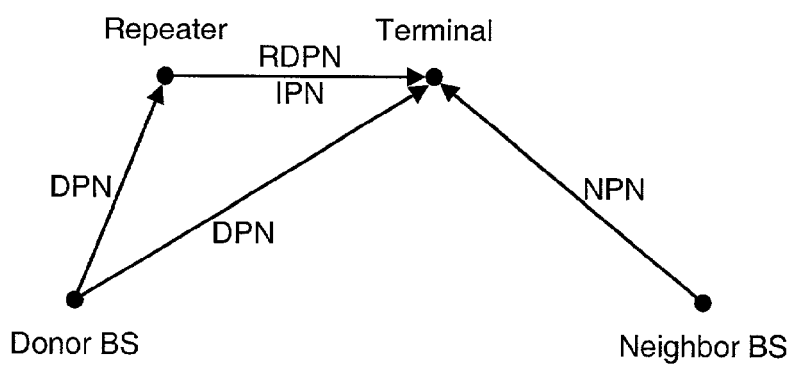

FIG. 6C is a diagram illustrating a scenario whereby the terminal is under a joint coverage area of the repeater, the donor base station, and the neighbor base station. For this scenario, the terminal receives the RDPN and IPN from the repeater, the DPN directly from the donor base station, and the NPN directly from the neighbor base station. The terminal would then report the earliest arriving multipath component for each distinct PN, which would be DPN and NPN received via non-repeated paths. The DPN and NPN may then be used by the PDE in the normal manner.

Figure 6D:
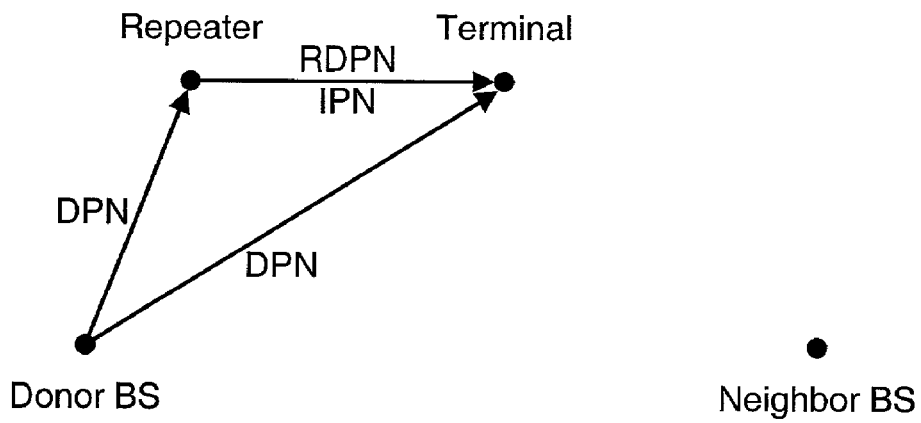

FIG. 6D is a diagram illustrating a scenario whereby the terminal is under a joint coverage area of the repeater and the donor base station. For this scenario, the terminal receives the RDPN and IPN from the repeater and the DPN directly from the donor base station. The terminal would then report the DPN and IPN, which are the earliest arriving multipath components for these PNs. If the DPN is delayed by $d_{rep}$ by the repeater to generate the RDPN, then the TDOA measurement for the DPN and IPN would be $r_{ipn} - r_{dpn} > d_{dn} + d_{mar} + d_{rep}$. The geometric test would then fail and this failure may be used as an indication that the IPN was received via the repeater.

Figure 6E:
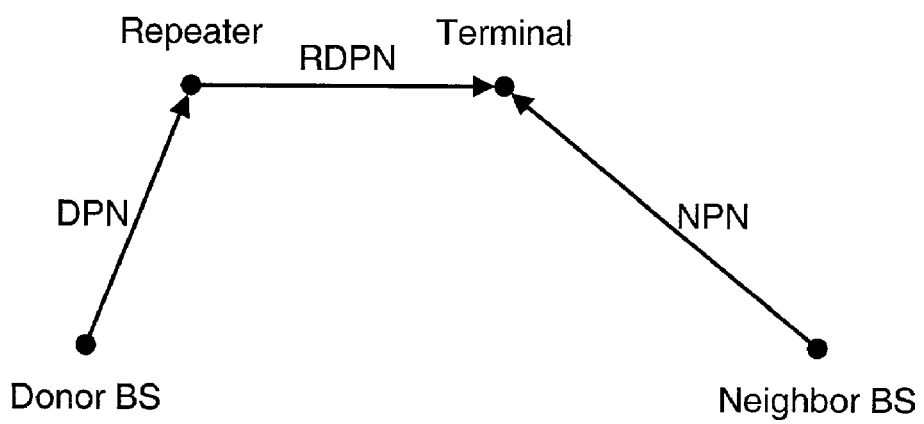

FIG. 6E is a diagram illustrating a scenario whereby the terminal is under a joint coverage area of the repeater and the neighbor base station. For this scenario, the terminal receives the RDPN from the repeater and the NPN directly from the neighbor base station. The terminal may or may not receive the IPN from the repeater. The terminal would then report the NPN, which is the earliest arriving multipath component for this PN, and the RDPN. The TDOA measurement for the RDPN and NPN would be $r_{rdpn} - r_{npn}$ or $r_{dpn} + d_{rep} - r_{npn}$.

If the repeater delay $d_{rep}$ is sufficiently great, then geometric test would fail and this failure may then be used to discard the measurements obtained from the repeater. However, if the delay of the NPN is sufficiently large or if the repeater delay is not large enough, then the TDOA measurement may not violate the geometric test. In that case, other techniques may be used to distinguish between (1) receiving the IPN via the repeater, and (2) receiving the NPN directly from the neighbor base station, with excess delay on the NPN. For example, more than one IPN may be used to make this determination. The probability of such an event occurring may be kept small by selecting the proper neighbor list PNs to use as the IPNs.

The scenario described in FIG. 6E typically does not occur for indoor repeaters but may occur for outdoor repeaters. This scenario may occur regardless of whether dedicated PNs or neighbor list PNs are used for the IPNs.

In the above description, the IPNs are assumed to be delayed in the positive direction with respect to the RDPNs. This is not a requirement. The IPNs may also be delayed in the negative direction by an amount ($d_{ipn}$) that is larger than the distance ($d_{dn}$) between the donor and neighbor base stations plus the repeater delay ($d_{rep}$) plus some margin ($d_{mar}$). This may be expressed as:

$$d_{ipn} \geq d_{dn} + d_{rep} + d_{mar}. \qquad \text{Eq (11)}$$

It should be noted that in one embodiment of the disclosed method and apparatus, when a signal is determined to have passed through a repeater, that signal is not used in position determination. This provides a simple and inexpensive way to ensure that the delay that is added to the signals travel time from the base station to the terminal does not cause an error in the position determination. That is, since the propagation delay between the time the signal is transmitted from the base station and the time the signal is received by the terminal will not accurately reflect the distance between the base station and the terminal, this delay should not be used in position determination. If additional information is available regarding the identify of the repeater that the signal passed through and the location of that repeater, then that information can be used in determining the position of the terminal. However, it should be noted that there may be sufficient information from other signals that do not pass through repeaters to make it possible to determine the position of the terminal without using information from signals that do pass through a repeater. In either case, knowing that the signal passed through a repeater and that additional delays were imparted on the signal by the repeater allows those delays to be taken into account, either by not using timing information for that signal, or by adjusting that timing information appropriately.

In the case in which the terminal provides a PDE with the codes of signals received by the terminal so that the PDE can determine whether the signals were transmitted from a repeater, the PDE makes a determination as to whether to use the signal or not and may select to ignore any signals that were transmitted by a repeater (not directly received by the terminal from a base station). In an alternative embodiment in which position determination is made at the terminal, or in which relative measurements are made that require the terminal to use information (such as relative phase of the received signals) to derive information that will be sent to an external device, such as the base station or PDE, the terminal may select to ignore information related to signals that are received from a repeater.

Figure 7:
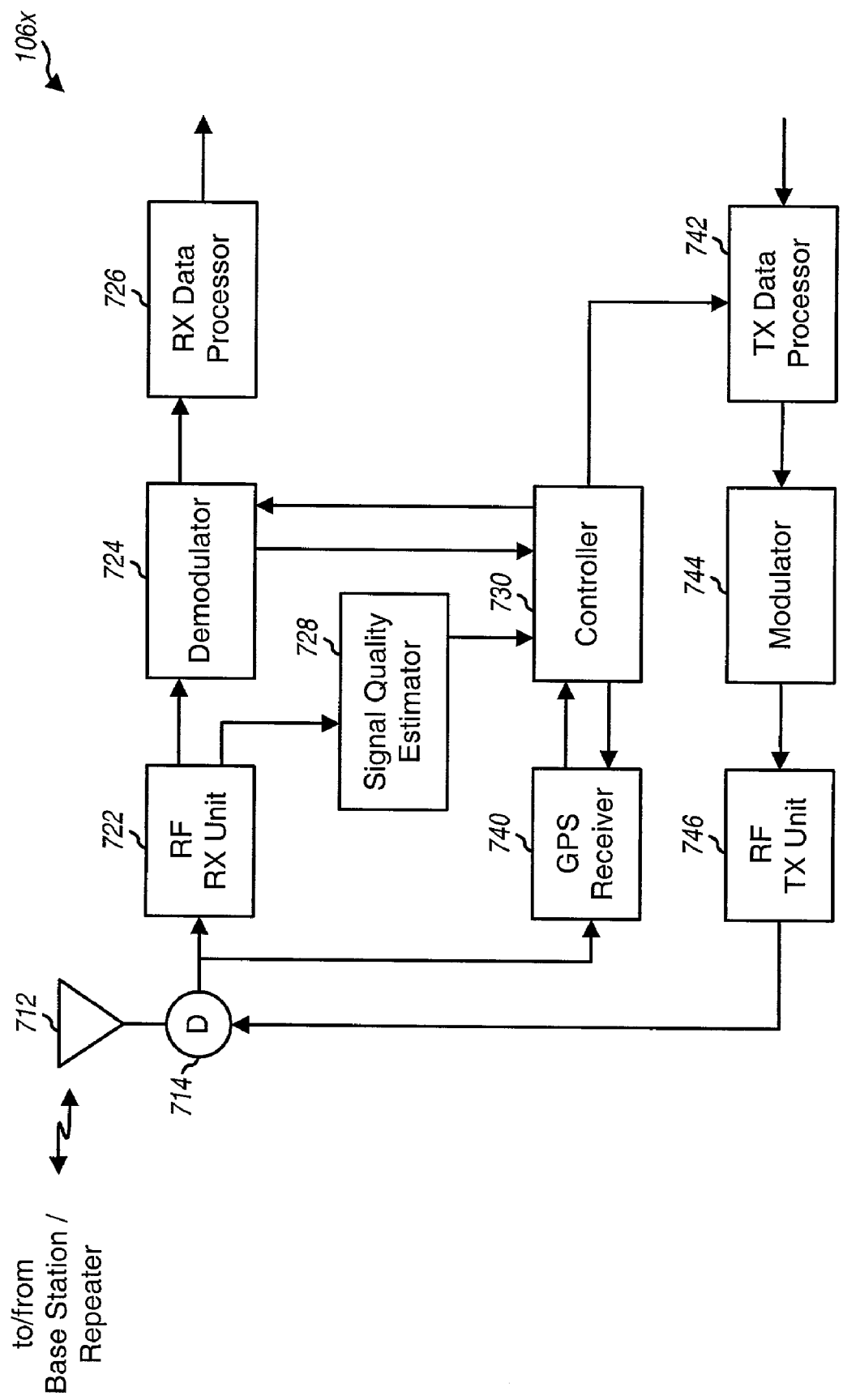
FIG. 7 is a block diagram of a terminal capable of implementing various aspects and embodiments of the disclosed method and apparatus.

FIG. 7 is a block diagram of a terminal 106$x$ capable of implementing various aspects and embodiments of the disclosed method and apparatus. On the forward link, signals from the GPS satellites, base stations, and/or repeaters are received by an antenna 712, routed through a duplexer 714, and provided to an RF receiver unit 722. RF receiver unit 722 conditions (e.g., filters, amplifies, and downconverts) and digitizes the received signal to provide samples. A demodulator 724 then receives and processes (e.g., despreads, decovers, and pilot demodulates) the samples to provide recovered symbols. Demodulator 724 may implement a rake receiver that can process multiple instances of the received signal and can combine recovered symbols for a number of multipaths. A receive data processor 726 then decodes the recovered symbols, checks the received frames, and provides the output data.

For position determination, RF receiver unit 722 may be operated to provide to a controller 730 the arrival times for the strongest received multipaths or the multipaths having signal strengths that exceed a particular threshold level. The samples from RF receiver unit 722 may also be provided to a signal quality estimator 728 that estimates the quality of the received signals. The signal quality can be estimated using various well known techniques, such as those described in U.S. Pat. Nos. 5,056,109 and 5,265,119. For position determination, demodulator 724 may be operated to provide PN sequences recovered from the base stations and identifier PNs recovered from the repeaters, if any.

GPS receiver 740 receives and searches for GPS signals based on search windows provided by controller 730. GPS receiver 740 then provides the time measurements for the GPS satellites to controller 730. In certain embodiments, GPS receiver 740 is not included in terminal 106$x$. The techniques described herein may be used for position determination methods that do no use a GPS receiver.

Controller 730 receives the measurements for the base stations and/or GPS satellites, the PN sequences for the base stations, the identifier PNs for the repeaters, the estimated signal quality of the received signals, or any combination thereof. In an embodiment, the measurements and identifier PNs are provided to a TX data processor 742 for transmission back to the PDE, which uses the information to determine the position of terminal 106$x$. Controller 730 may further provide signals to direct the units within terminal 106$x$ to perform the proper signal processing. For example, controller 730 may provide a first signal to demodulator 724 to direct searching for PN over a particular range of chip offset, a second signal indicating the search windows to be used by GPS receiver 740 to search for the signals from the GPS satellites, and so on.

Demodulator 724 searches for strong instances of pilot references from the base stations (which may be repeated) and for the identifier PN (e.g., if directed). This may be achieved by correlating the received samples with a locally generated PN sequence at various offsets. A high correlated result indicates a high likelihood of a PN being received at that offset.

Various schemes may be implemented to ensure that demodulator 724 searches for the identifier PNs from the repeaters, if appropriate. In one scheme, the identifier PNs are included in a neighbor list of PN sequences to be searched. The neighbor list maintained for each active terminal typically includes strong pilot references detected by the terminal. In another scheme, the neighbor list for each active terminal is sent by the PDE. In this case, the PDE can be provided with information regarding the base stations in the system, their associated repeaters, and the identifier PNs for the repeaters. The PDE then ensures that the proper identifier PNs are included in the neighbor list for each active terminal. In yet another scheme, the PDE can automatically send to the terminal a list of PNs to search, including the identifier PNs. This list may be sent for position location related calls. In yet another scheme, the list of identifier PNs may be broadcast to the terminals in a broadcast channel. In yet another scheme, the PDE can send the identifier PNs to a terminal upon request, for example, when it is known that repeaters are present and there are not enough GPS measurements to perform position determination.

On the reverse link, data is processed (e.g., formatted, encoded) by a transmit (TX) data processor 742, further processed (e.g., covered, spread) by a modulator (MOD) 744, and conditioned (e.g., converted to analog signals, amplified, filtered, modulated, and so on) by an RF TX unit 746 to generate a reverse modulated signal. The information (e.g., the identifier PN) from controller 730 may be multiplexed with the processed data by modulator 744. The reverse modulated signal is then routed through duplexer 714 and transmitted via antenna 712 to the base stations and/or repeaters.

Figure 8:
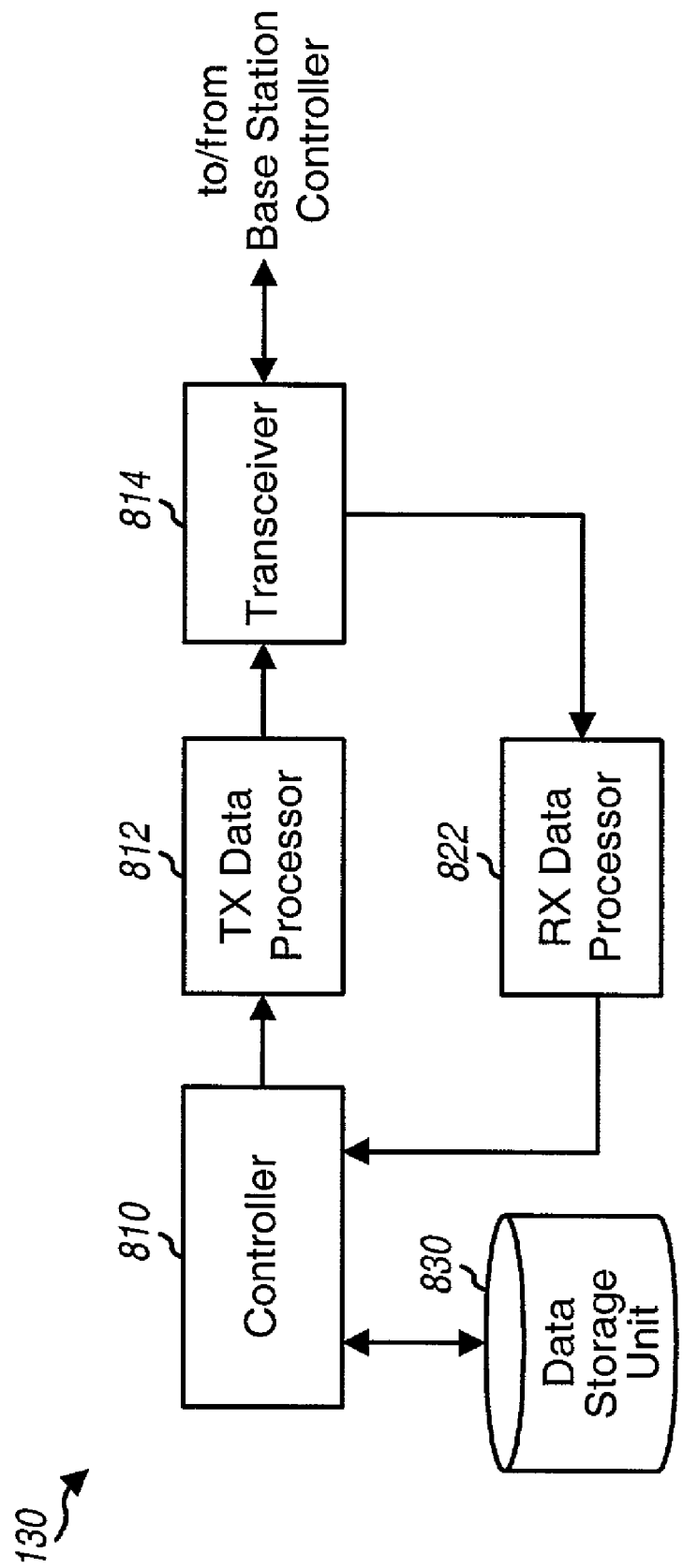
FIG. 8 is a block diagram of an embodiment of a Position Determining Entity (PDE) for use with the disclosed method and apparatus.

FIG. 8 is a block diagram of an embodiment of PDE 130 capable of supporting various aspects of the disclosed method and apparatus. PDE 130 interfaces with BSC 120 and exchanges information related to position determination.

On the reverse link, data in a reverse modulated signal for a terminal is sent to a repeater, transmitted to a base station, routed to a BSC, and provided to the PDE. Within the PDE, the reverse modulated signal from the terminal is processed by a transceiver 814 to provide samples, which are further processed by a RX data processor 822 to recover the data transmitted by the terminal. This data may include any combination of measurements, identifier PNs, and so on, reported by the terminal. Data processor 822 then provides the received data to a controller 810.

Controller 810 may also receive additional data from a data storage unit 830 (e.g., information indicating whether a base station is repeated, the center of the coverage area and the delay associated with each repeater, and so on) and estimates the position for the terminal based on the data from the terminal and the additional data from storage unit 830. Storage unit 830 may be used to store a table of the base stations, their associated repeaters (if any), and the identifier PN and the position estimate (e.g., the center of the coverage area) for each repeater.

In certain embodiments, controller 810 determines the identifier PN to be included in the neighbor list for terminals in all sectors. Alternatively, the identifier PN may be provided by controller 810 to the terminal for the case where the identifier PNs are not included in the neighbor list. The identifier PN is then provided to a TX data processor 812, which properly formats and sends the data to transceiver 814. Transceiver 814 further conditions the data and sends the data to the terminal via the BSC, base station, and (possibly) repeater.

The techniques described herein may be advantageously used for position determination in indoor applications where signals from other base stations and/or GPS satellites may not be received and the coverage areas of the repeaters are typically small. The techniques described herein may also be used for outdoor applications. In an embodiment, an outdoor repeater may be calibrated to determine the delay associated with the repeater. The identifier signal transmitted by the outdoor repeater may be used to identify the specific repeater through which a repeated forward modulated signal is received by a terminal. The measurements for the terminal under this repeater's coverage may then be adjusted accordingly to obtain more accurate measurements. For example, the round trip delay (RTD) from the repeater location may be adjusted based on the delay associated with the repeater. The time offset at the terminal may also be updated to reflect the delay of the repeater, thus allowing for more accurate time reference for GPS measurements. The techniques described herein may also be used in cases where duplicate PNs are observed by a terminal.

As noted above, the coverage area of a repeater for indoor applications is typically small. If the center of the repeater coverage area is provided as the position estimate for a terminal within the repeater's coverage, then the error is small in many (if not most) cases and can be expected to meet the E-911 mandate imposed by the FCC. In an embodiment, the entity responsible for performing the position estimate (the PDE, or the terminal) may also be provided with an estimate of the size of the repeater's coverage area. In this case, the entity may be able to report the degree of confidence in the accuracy of the position estimate (e.g., whether or not it meets the E-911 mandate).

For clarity, the identification code for each repeater is described above as being implemented with a PN sequence at a particular (PN INC) offset. The identification code for the repeater may also be implemented in various other manners. For example, the identification code may be implemented with any PN sequence (and not necessary the same PN sequence use for spreading in CDMA systems), a gold code, any low data rate code that can be modulated on the signal to be repeated, and so on. The identification code for the repeater may or may not be aligned to the system time, as observed at the terminal.

For clarity, various aspects and embodiments have been specifically described for an IS-95 CDMA system. The techniques described herein may also be used for other types of CDMA systems and other non-CDMA systems. For example, the use of identification codes (e.g., identifier PNs) for repeater identification may also be used for a W-CDMA system, a cdma2000 system, and so on. The identification codes for repeater identification may also be used for a GSM system. For the GSM system, the identification code can be transmitted on a "dummy" channel (with or without a given offset) on a different frequency instead of the same frequency used for the forward modulated signal. A different channel on a different frequency may be used for each repeater within a sector or a geographic area, or the repeater may be differentiated by the data transmitted on a given channel or by the offset of the channel, The identification code may also be transmitted using any spread spectrum communication technique within a CDMA channel or using some another communication techniques. In the embodiments described above, the identification code for the repeater is sent contemporaneously with the forward modulated signal by the repeater. In some other embodiments, the identification code for the repeater may be transmitted on another "local" system such as, for example, a wireless system operating at the same time. One such wireless system may be a wireless LAN IEEE-802.11 system.

Other schemes may also be used to identify repeaters within a wireless communication system. In one scheme, if the system and terminal are able to report a multipath profile, then an identifying multipath profile may be created based (e.g., on the forward modulated signal) and used for repeater identification. CDMA terminals are typically able to process multiple instances of a received signal that may have been generated from reflections in the signal path. The multipaths are typically demodulated and combined by the terminal to provide symbols that are then decoded. If the profile of the multipaths can be reported, then each repeater may be associated with a particular multipath profile instead of an identifier signal.

The multipath profile for each repeater may be generated in various manners. In one embodiment, the forward modulated signal is delayed (and possibly attenuated) by multiple specific values, and the multiple delayed signals are combined and transmitted to the terminals. The number of multipaths and the amount of delay for each multipath may be selected such that a unique multipath profile is created and can be used to specifically identify each repeater. In another embodiment, the identifier PN can be delayed by multiple specific chip offsets, and the delayed PN sequences can be combined to provide the multipath profile. For this embodiment, the PN sequence of the serving base station may be used (instead of an identifier PN) to generate the multipath profile.

The repeater identification may also be transmitted via an auxiliary low rate CDMA channel, which may be aligned to the CDMA channels from the serving base station. The identification code for the repeater may then be transmitted as data on the low rate channel.

Besides the advantages noted above from using the identifier signal described herein, another advantage is the ability to determine position estimates without having to disconnect a voice call. In accordance with the IS-801 standard, a pilot measurement is sent to the PDE when a terminal sends a request for assistance from GPS to estimate the position of the terminal. If the PDE recognizes the identifier PN in the list of PN sequences reported by the terminal, there is likely to be no need to perform a GPS measurement since the terminal is under the coverage of a repeater and may not be able to receive GPS signals anyway. Moreover, the position estimate for the terminal may be determined to the requisite degree of accuracy based solely on the identifier PN (e.g., the terminal's position may be estimated as the center of the repeater's coverage area). In this case, the identifier PN is included in the neighbor list of all base stations that employ repeaters so that the terminal will search for the identifier PN. Alternatively, if the PDE has reason to suspect that the signal received by the terminal is transmitted by a repeater, a list of identifier PNs may be sent to the terminal prior to sending the GPS aiding information.

Some of the elements of the repeater used to implement the techniques described herein (e.g., the PN generator, controller, and upconverter) may be implemented with a digital signal processor (DSP), an application specific integrated circuit (ASIC), a processor, a microprocessor, a controller, a microcontroller, a field programmable gate array (FPGA), a programmable logic device, other electronic unit, or any combination thereof designed to perform the functions described herein. Certain aspects of the disclosed method and apparatus may be implemented in hardware, software, or a combination of both. For example, the processing to form the neighbor list for each active terminal, the estimate of the position of a terminal, and so on, may be performed based on program codes stored within a memory unit and executed by a processor (controller 810 in FIG. 8).

The previous description of the disclosed embodiments is provided to enable any person skilled in the art to make or use the present disclosed method and apparatus. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for determining the location of a device in a wireless communication system, comprising:
   receiving from a transmission source comprising a terrestrial-based wireless repeater at a known location, a first signal having included therein transmitted data and a second signal having included therein an identification code assigned to the transmission source, wherein the identification code comprises a plurality of delayed and attenuated versions of the first signal and representative of a particular multipath profile;
   processing the second signal to recover the identification code; and
   determining a position estimate of the device based on the recovered identification code.

2. The method of claim 1, wherein the identification code comprises a pseudo-noise (PN) sequence at a particular offset.

3. The method of claim 1, wherein the identification code comprises a plurality of pseudo-noise (PN) sequences.

4. The method of claim 3, wherein the plurality of PN sequences are at particular offsets.

5. The method of claim 1, wherein the identification code comprises a delayed and attenuated version of the first signal.

6. The method of claim 1, wherein the identification code comprises a signal transmitted at a frequency different from the frequency of the first signal.

7. The method of claim 1, wherein the identification code is a pseudo-noise (PN) sequence at a particular offset.

8. The method of claim 1, wherein the position estimate of the device is a particular location within a coverage area of the repeater.

9. A method for determining the location of a device in a wireless communication system, comprising:
   receiving from a transmission source comprising a terrestrial-based wireless repeater at a known location, a first signal having included therein transmitted data and a second signal having included therein an identification code assigned to the transmission source;
   processing the second signal to recover the identification code; and
   determining a position estimate of the device based on the recovered identification code;
   wherein the identification code comprises a signal transmitted at a frequency different from the frequency of the first signal and at a particular transmit offset.

10. The method of claim 9, wherein the identification code comprises one or more Gold code sequences.

11. The method of claim 10, wherein each Gold code sequence is at a particular offset.

12. The method of claim 9, further comprising:
   adjusting a set of measurements for position determination in accordance with the recovered identification code.

13. The method of claim 9, wherein the position estimate of the device is a particular location within a coverage area of the transmission source.

14. The method of claim 13, wherein the position estimate of the device is approximately the center of the coverage area of the transmission source.

15. A method for generating a signal suitable for use to estimate the location of a device in a wireless communication system, comprising:
   receiving at a transmission source a forward link signal having included therein at least a pilot signal;
   processing the forward link signal to recover a timing reference, and processing the forward link signal to recover a frequency reference for a carrier signal of the forward link signal,
   generating at the transmission source a second signal having included therein an identification code assigned to the transmission source;
   combining the forward link signal and the second signal to provide a combined signal, wherein the second signal is further generated in accordance with the recovered frequency reference and the recovered timing reference; and
   transmitting the combined signal from the transmission source.

16. The method of claim 15, wherein the identification code is a pseudo-noise (PN) sequence at a particular offset.

17. A method for generating a signal suitable for use to estimate the location of a device in a wireless communication system, comprising:
   receiving at a transmission source a forward link signal having included therein at least a pilot signal;
   generating at the transmission source a second signal having included therein an identification code assigned to the transmission source;
   combining the forward link signal and the second signal to provide a combined signal; and
   transmitting the combined signal from the transmission source;
   wherein the identification code is a pseudo-noise (PN) sequence at a particular offset, and wherein the offset of the PN sequence used for the identification code is one of a plurality of possible offsets and is reserved for identification of the transmission source.

18. The method of claim 17, wherein the transmission source is a wireless repeater unit in the communication system.

19. The method of claim 18, further comprising:
   conditioning the combined signals within the repeater unit, and wherein the conditioned signal from the repeater unit is transmitted from the repeater.

20. The method of claim 18, further comprising:
conditioning the forward link signal within the repeater unit, and
wherein the second signal is combined with the conditioned forward link signal within the repeater unit.

21. The method of claim 17, wherein a carrier frequency of the second signal approximates a carrier frequency of the forward link signal.

22. A method for generating a signal suitable for use to estimate the location of a device in a wireless communication system, comprising;
receiving at a transmission source a forward link signal having included therein at least a pilot signal;
generating at the transmission source a second signal having included therein an identification code assigned to the transmission source;
combining the forward link signal and the second signal to provide a combined signal; and
transmitting the combined signal from the transmission source;
wherein the identification code is a pseudo-noise (PN) sequence at a particular offset, and wherein the timing of the PN sequence used for the identification code is approximately aligned with the timing of a PN sequence used to spread the pilot signal.

23. A method for generating a signal suitable for use to estimate the location of a device in a wireless communication system, comprising:
receiving at a transmission source a forward link signal having included therein at least a pilot signal;
generating at the transmission source a second signal having included therein an identification code assigned to the transmission source;
combining the forward link signal and the second signal to provide a combined signal wherein an amplitude of the second signal is set to a particular level below the amplitude of the forward link signal; and
transmitting the combined signal from the transmission source.

24. A method for generating a signal suitable for use to estimate the location of a terminal in a wireless communication system, comprising:
receiving and processing at a transmission source a forward link signal having included therein at least a pilot signal;
generating a second signal having included therein an identification code assigned to the transmission source;
wherein the second signal comprises a plurality of signals at different offsets and representative of a particular multipath profile;
transmitting the forward link signal from the transmission source; and
transmitting the second signal to a plurality of terminals within the communication system.

25. A method for generating a signal suitable for use to estimate the location of a terminal in a wireless communication system, comprising:
receiving and processing at a transmission source a forward link signal having included therein at least a pilot signal;
generating a second signal having included therein an identification code assigned to the transmission source wherein the second signal comprises a plurality of pseudo-noise (PN) sequences at a plurality of offsets and representative of a particular multipath profile;
transmitting the forward link signal from the transmission source; and
transmitting the second signal to a plurality of terminals within the communication system.

26. A transmission unit in a wireless communication system, comprising:
a first unit operative to receive, condition, and retransmit signals on both forward and reverse links of the communication system; and
a second unit coupled to the first unit and including
a first module operative to receive and process a forward link signal having included therein at least a pilot signal,
a second module operative to generate a second signal having included therein an identification code assigned to the transmission unit, and
a third module operative to combine the forward link signal and the second signal to provide a combined signal for transmission from the transmission unit;
wherein the first module is further operative to process the forward link signal to recover a frequency reference for a carrier signal of the forward link signal, and wherein the second signal is further generated in accordance with the recovered frequency reference.

27. A method for determining the location of a device in a wireless communication system, comprising:
receiving from a first transmission source a first signal having included therein transmitted data and a second signal having included therein a first identification code assigned to the first transmission source, wherein the first identification code is selected from among a list of identification codes used for nearby transmission sources, wherein the first identification code comprises a plurality of identification codes in the list, and wherein the plurality of identification codes for the first identification code are associated with different offsets;
processing the second signal to recover the first identification code; and
determining a position estimate of the device based on the recovered first identification code.

28. The method of claim 27, wherein a determination of whether the first identification code is received from the first transmission source or another transmission source is made based on geometric constraint.

29. The method of claim 28, wherein the geometric constraint relates to time difference of arrival (TDOA) measurement.

30. The method of claim 27, wherein only identification codes in the list that are not repeated by other transmission sources are available for use as the first identification code for the first transmission source.

31. The method of claim 27, wherein the nearby transmission sources are neighbor base stations, and the identification codes in the list are PN sequences assigned to the neighbor base stations.

32. A method for determining the location of a device in a wireless communication system, comprising:
receiving from a first transmission source a first signal having included therein transmitted data and a second signal having included therein a first identification code assigned to the first transmission source, wherein the first identification code is selected from among a list of identification codes used for nearby transmission sources;

wherein the identification code assigned to the first transmission source is delayed relative to the first signal by a particular amount of delay;

processing the second signal to recover the first identification code; and determining a position estimate of the device based on the recovered first identification code.

33. The method of claim 32, wherein the amount of delay is selected to allow for determination of whether the first identification code is received from the first transmission source or another transmission source.

* * * * *